US012535438B2

(12) United States Patent
Baranovskiy et al.

(10) Patent No.: US 12,535,438 B2
(45) Date of Patent: Jan. 27, 2026

(54) ANALYSIS OF X-RAY SCATTEROMETRY DATA USING DEEP LEARNING

(71) Applicant: BRUKER TECHNOLOGIES LTD., Migdal HaEmek (IL)

(72) Inventors: Andrei Baranovskiy, Haifa (IL); Inbar Grinberg, Ramat Yishay (IL); Michael G. Greene, Migdal HaEmek (IL); Matthew Wormington, Highlands Ranch, CO (US)

(73) Assignee: Bruker Technologies Ltd., Migdal HaEmek (IL)

( * ) Notice: Subject to any disclaimer, the term of this patent is extended or adjusted under 35 U.S.C. 154(b) by 456 days.

(21) Appl. No.: 18/333,555

(22) Filed: Jun. 13, 2023

(65) Prior Publication Data
US 2024/0027374 A1    Jan. 25, 2024

Related U.S. Application Data

(60) Provisional application No. 63/482,599, filed on Feb. 1, 2023, provisional application No. 63/390,328, filed on Jul. 19, 2022.

(51) Int. Cl.
*G01N 23/207* (2018.01)
*G06N 3/08* (2023.01)

(52) U.S. Cl.
CPC .............. *G01N 23/207* (2013.01); *G06N 3/08* (2013.01); *G01N 2223/6116* (2013.01)

(58) Field of Classification Search
CPC ......... G01N 2223/6116; G01N 23/201; G01N 23/2055; G01N 2223/0566; G01N 23/207;
(Continued)

(56) References Cited

U.S. PATENT DOCUMENTS 6,381,303 B1    4/2002 Vu et al.
6,895,075 B2    5/2005 Yokhin et al.
(Continued)

FOREIGN PATENT DOCUMENTS

WO    2021121906 A1    6/2021
WO    2022128373 A1    6/2022

OTHER PUBLICATIONS

Onto Innovation, "Product News: Onto Innovation Announces Suite of Three New Metrology Systems for Complete Critical Dimension Process Control," News Release, pp. 1-4, Jun. 8, 2020.
(Continued)

*Primary Examiner* — Mohammad K Islam
(74) *Attorney, Agent, or Firm* — Meitar Patents Ltd.; Daniel Kligler

(57) ABSTRACT

A method for training a neural network (NN), the method includes: receiving a training dataset including: (a) multiple pairs of: (i) a diffraction image indicative of X-ray photons diffracted from structures formed in a sample responsively to directing an incident X-ray beam at an angle relative to the sample, and (ii) a label, including: a first parameter indicative of at least a first property of the structures, and a second parameter indicative of at least a second property of the incident X-ray beam, and (b) multiple predefined outputs for the multiple pairs, respectively. The NN is trained to obtain the predefined outputs by: (i) applying the NN to at least a given pair of the pairs, and (ii) responsively to receiving from the NN an estimated output of the given pair, providing the NN with a given predefined output of the predefined outputs that corresponds to the given pair.

20 Claims, 6 Drawing Sheets

(58) Field of Classification Search
CPC ..... G01N 2223/054; G01N 2223/1016; G01N 2223/401; G06N 3/08; G06N 3/04; G06N 3/045; G06N 3/084
See application file for complete search history.

(56) References Cited

U.S. PATENT DOCUMENTS

| | | |
|---|---|---|
| 10,365,225 B1 | 7/2019 | Pandev et al. |
| 10,684,238 B2 | 6/2020 | Krokhmal et al. |
| 11,313,809 B1 | 4/2022 | Pandev et al. |
| 11,408,837 B2 | 8/2022 | Ito et al. |
| 2013/0262044 A1 | 10/2013 | Pandev et al. |
| 2014/0172394 A1 | 6/2014 | Kutsnetsov et al. |
| 2014/0297211 A1 | 10/2014 | Pandev et al. |
| 2014/0316730 A1 | 10/2014 | Shchegrov et al. |
| 2015/0176985 A1 | 6/2015 | Shchegrov et al. |
| 2015/0204802 A1* | 7/2015 | Pois ............... G01N 23/207 378/86 |
| 2015/0235108 A1 | 8/2015 | Pandev |
| 2015/0323316 A1 | 11/2015 | Shchegrov et al. |
| 2016/0003609 A1 | 1/2016 | Shchegrov et al. |
| 2016/0109230 A1 | 4/2016 | Pandev et al. |
| 2016/0109375 A1 | 4/2016 | Pandev et al. |
| 2016/0117812 A1 | 4/2016 | Pandev et al. |
| 2016/0141193 A1 | 5/2016 | Pandev et al. |
| 2016/0171727 A1 | 6/2016 | Bouchard et al. |
| 2016/0282105 A1 | 9/2016 | Pandev |
| 2016/0320319 A1 | 11/2016 | Hench et al. |
| 2016/0327605 A1 | 11/2016 | Pandev et al. |
| 2017/0045356 A1 | 2/2017 | Pandev et al. |
| 2017/0061604 A1 | 3/2017 | Pandev |
| 2017/0287751 A1 | 10/2017 | Kuznetsov et al. |
| 2018/0106735 A1* | 4/2018 | Gellineau ............. G01B 15/04 |
| 2018/0108578 A1 | 4/2018 | Pandev et al. |
| 2018/0252514 A1 | 9/2018 | Pandev et al. |
| 2018/0350699 A1* | 12/2018 | Gellineau ........... G03F 7/70616 |
| 2019/0049602 A1 | 2/2019 | Hench et al. |
| 2019/0302039 A1* | 10/2019 | Artemiev ......... G01N 23/20008 |
| 2019/0323974 A1 | 10/2019 | Wormington et al. |
| 2020/0200525 A1 | 6/2020 | Chouaib et al. |
| 2020/0335406 A1 | 10/2020 | Liman et al. |
| 2021/0063329 A1 | 3/2021 | Kuznetsov et al. |
| 2021/0157228 A1 | 5/2021 | Sriraman et al. |
| 2021/0165398 A1 | 6/2021 | Pandev et al. |
| 2021/0166375 A1 | 6/2021 | Pandev |
| 2021/0293532 A1 | 9/2021 | Chouaib et al. |
| 2022/0042933 A1 | 2/2022 | Dikopoltsev et al. |
| 2022/0090912 A1 | 3/2022 | Sanko et al. |
| 2022/0114438 A1 | 4/2022 | Pandev et al. |
| 2022/0252395 A1 | 8/2022 | Hench et al. |

OTHER PUBLICATIONS

Settens, "An Assessment of Critical Dimension Small Angle X-ray Scattering Metrology for Advanced Semiconductor Manufacturing," Ph.D. Thesis submitted to the University at Albany, State University of New York, College of Nanoscale Science and Engineering, Department of Nanoscale Science, pp. 1-239, year 2015.
Wikipedia, "AlexNet," pp. 1-4, last updated Jun. 10, 2022.
Barnes et al., "PatchMatch: A Randomized Correspondence Algorithm for Structural Image Editing," ACM Transactions on Graphics, vol. 28, issue 3, article No. 4, pp. 1-11, year 2009.
Liu et al., "X-ray Scatterometry Using Deep Learning," Tenth International Symposium on Precision Mechanical Measurements, Proceedings of the Society of Photo-Optical Instrumentation Engineers (SPIE), vol. 12059, pp. 120591M-1-120591M-7, Jul. 2022.

* cited by examiner

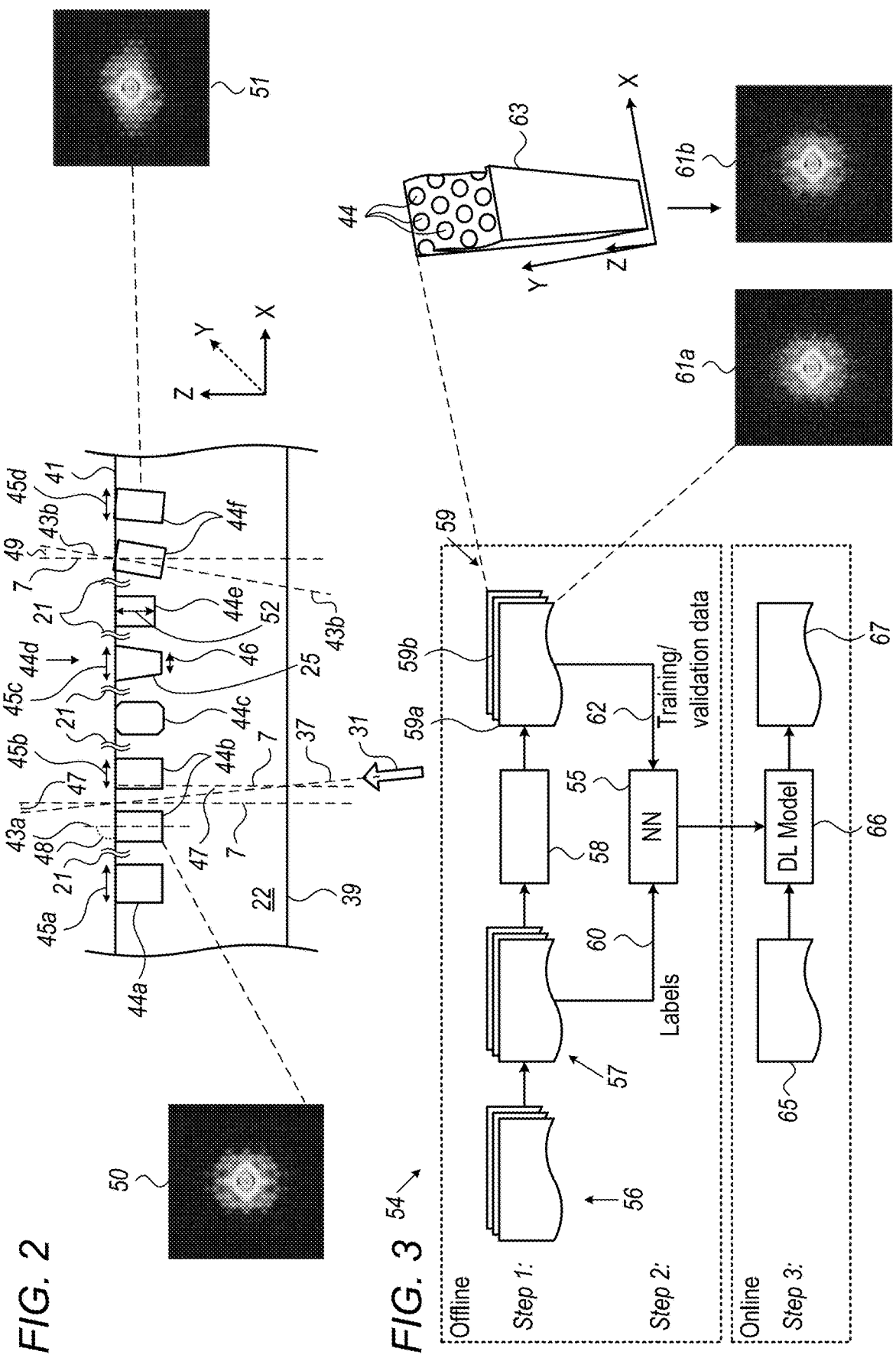

ANALYSIS OF X-RAY SCATTEROMETRY DATA USING DEEP LEARNING

CROSS-REFERENCE TO RELATED APPLICATIONS

This application claims the benefit of U.S. Provisional Patent Application 63/390,328, filed Jul. 19, 2022, and U.S. Provisional Patent Application 63/482,599, filed Feb. 1, 2023. The disclosures of both related applications are incorporated herein by reference.

FIELD OF THE INVENTION

The present invention relates generally to X-ray analysis, and particularly to methods and systems for analyzing X-ray scatterometry data using deep learning techniques.

BACKGROUND OF THE INVENTION

Various techniques for measuring critical dimensions (CDs) of structures formed on semiconductor and other substrates are known in the art. Such techniques may comprise scatterometry and data analysis using neural networks.

For example, U.S. Patent Application Publication 2019/0049602 describes methods and systems for X-Ray scatterometry measurements of on-device structures. The measurements structures over a measurement area include a decomposition of the one or more structures into a plurality of sub-structures, and a decomposition of the measurement area into a plurality of sub-areas, or both. The decomposed structures, measurement areas, or both, are independently simulated. The scattering contributions of each of the independently simulated decomposed structures are combined to simulate the actual scattering of the measured structures within the measurement area. In a further aspect, measured intensities and modelled intensities including one or more incidental structures are employed to perform measurement of structures of interest. In other further aspects, measurement decomposition is employed to train a measurement model and to optimize a measurement recipe for a particular measurement application.

U.S. Patent Application Publication 2020/0333267 describes a fine structure determination method capable of easily determining tilt angles of columnar scattering bodies that are long in a thickness direction, and provided are an analysis apparatus and an analysis program thereof. There is provided an analysis method for a fine structure of a plate-shaped sample formed to have columnar scattering bodies that are long in a thickness direction and periodically arranged, comprising the steps of preparing scattering intensity data from the plate-shaped sample, that is generated via transmission of X-rays, and determining tilt angles of the scattering bodies in the plate-shaped sample with respect to a reference rotation position at which a surface of the plate-shaped sample is perpendicular to an incident direction of the X-rays, based on the prepared scattering intensity data.

U.S. Patent Application Publication 2022/0252395 describes methods and systems for estimating values of geometric parameters characterizing in-plane, distorted shapes of high aspect ratio semiconductor structures based on x-ray scatterometry measurements. A parameterized geometric model captures the scattering signature of in-plane, non-elliptical distortions in hole shape. By increasing the number of independent parameters employed to describe the in-plane shape of hole structures the model fit to the actual shape of high aspect ratio structures is improved. In one aspect, a geometrically parameterized measurement model includes more than two degrees of freedom to characterize the in-plane shape of a measured structure. In some embodiments, the geometric model includes a closed curve having three degrees of freedom or more. In some embodiments, the geometric model includes a piecewise assembly of two or more conic sections. Independent geometric model parameters are expressed as functions of depth to capture shape variation through the structure.

U.S. Patent Application Publication 2014/0316730 describes methods and systems for performing semiconductor metrology directly on device structures. A measurement model is created based on measured training data collected from at least one device structure. The trained measurement model is used to calculate process parameter values, structure parameter values, or both, directly from measurement data collected from device structures of other wafers. In some examples, measurement data from multiple targets is collected for model building, training, and measurement. In some examples, the use of measurement data associated with multiple targets eliminates, or significantly reduces, the effect of under layers in the measurement result, and enables more accurate measurements. Measurement data collected for model building, training, and measurement may be derived from measurements performed by a combination of multiple, different measurement techniques.

SUMMARY OF THE INVENTION

An embodiment of the present invention that is described herein provides a method for training a neural network (NN), the method includes:
  receiving a training dataset including:
   (a) one or more pairs of: (i) a diffraction image indicative of X-ray photons diffracted from one or more structures formed in a sample responsively to directing an incident X-ray beam at an angle relative to the sample, and (ii) a label, including: a first parameter indicative of at least a first property of the one or more structures, and a second parameter indicative of at least a second property of the incident X-ray beam, and
   (b) one or more predefined outputs for the one or more pairs, respectively.
  The NN is trained to obtain the predefined outputs by: (i) applying the NN to at least a given pair of the pairs, and (ii) responsively to receiving from the NN an estimated output of the given pair, providing the NN with a given predefined output of the predefined outputs that corresponds to the given pair.

In some embodiments, the diffraction image of at least one of the one or more pairs includes a synthetic diffraction image, which is produced based on the label and empirical data. In other embodiments, the one or more structures have a nominal structure, and the first parameter includes a structural variation from the nominal structure. In yet other embodiments, the one or more structures include one or both of: (a) a first array of lines and trenches, and (b) a second array of holes, and the structural variation includes one or more variations selected from a list of variations consisting of: (i) a width, (ii) a depth, (iii) a tilt, (iv) a roughness, (v) a center line shift (CLS), (vi) a shape of sidewall, and (vii) a joint shift (JS) between at least first and second structured formed over one another in a stack of first and second layers, respectively.

In some embodiments, the structural variation includes one or more variations in at least one of: (i) between at least two of the lines of the first array, (ii) between two of the trenches in the first array, and (iii) between at least two of the holes of the second array. In other embodiments, the predefined outputs include one or both of: (i) a size of at least one of the structures in a measurement when directing the incident X-ray beam, and (ii) a recommended angle for directing the incident X-ray beam to the sample in a subsequent measurement. In yet other embodiments, the diffraction image includes a first diffraction image having a first intensity when directing the incident X-ray beam at the angle, and a second diffraction image having a second intensity, different from the first intensity, when directing the incident X-ray beam at the recommended angle.

In some embodiments, the first diffraction image has a first symmetry, and the second diffraction image has a second symmetry, different from the first symmetry. In other embodiments, the method includes applying a multi-subshot technique for determining the recommended angle for directing the incident X-ray beam to the sample in the subsequent measurement.

In some embodiments, the NN includes a convolutional neural network (CNN). In other embodiments, the CNN includes (a) a first CNN having one or more (i) convolutional layers, (ii) first, second and third dropout layers, and (iii) fully connected layers, or (b) a second CNN having (i) one or more convolutional layers, and (ii) one or more fully connected layers. In yet other embodiments, the first CNN includes a first block having: (i) the first dropout layer, (ii) at least first and second convolutional layers, and at least an activation function.

In some embodiments, (a) the diffraction image has a given size, (b) the first convolutional layer has a first size, smaller than the given size, and a first number of convolutional filters (CFs), and the second convolutional layer has a second size, smaller than the first size, and a second number of CFs, larger than the first number of CFs. In other embodiments, applying the first CNN includes: (i) applying the first dropout layer to the diffraction image for obtaining a first output, (ii) applying the first convolutional image to the first output for obtaining a second output, (iii) applying the activation function to the second output for obtaining a third output, (iv) applying the second convolutional image to the third output for obtaining a fourth output, and (v) applying the activation function to the fourth output for obtaining a fifth output. In yet other embodiments, the first CNN includes a second block having: (i) a second dropout layer, (ii) at least third and fourth convolutional layers, and a rectified linear unit (ReLU).

In some embodiments, the method includes: (i) applying the second dropout layer to the fifth output for obtaining the sixth output, (ii) applying the third convolutional image to the sixth output for obtaining a seventh output, (iii) applying the ReLU to the seventh output for obtaining an eighth output, (iv) applying the fourth convolutional image to the third output for obtaining a nineth output, and (v) applying the ReLU to the nineth output for obtaining a tenth output. In other embodiments, the first CNN includes a third block having: (i) a third dropout layer, (ii) at least a one-dimensional multilayer (1DML) including a plurality of channels, and the ReLU.

In some embodiments, the method includes: (i) applying the third dropout layer to the tenth output for obtaining an eleventh output, (ii) applying the 1DML to the eleventh output for obtaining a twelfth output, and (iii) applying the ReLU to the twelfth output for obtaining a thirteenth output. In other embodiments, the diffraction image has cartesian coordinates, and training the second CNN includes converting the cartesian coordinates to polar coordinates to obtain a radial image, and subsequently, applying at least one of the convolutional layers to the radial image to obtain a radial output. In yet other embodiments, the method includes applying a rectified linear unit (ReLU) to the first radial output.

In some embodiments, the diffraction image has polar coordinates, and training the second CNN includes applying at least one of the convolutional layers to the radial image to obtain a radial output. In other embodiments, the method includes applying a rectified linear unit (ReLU) to the radial output. In yet other embodiments, the method includes storing one or more thresholds indicative of at least a criterion for concluding the training of the NN.

In some embodiments, training the NN includes applying supervised training, and after the training, the NN includes a trained deep learning model. In other embodiments, the diffraction image of at least one of the one or more pairs includes a synthetic diffraction image, and including, producing the synthetic diffraction image based on the label and applying a born approximation of a kinematical scattering theory.

In some embodiments, the method includes applying, to the diffraction image of each pair, one or more preprocessing steps for improving a quality of the NN training. In other embodiments, at least one of the preprocessing steps includes applying a logarithmic or square root transformation to an intensity level of the diffraction image. In yet other embodiments, at least one of the preprocessing steps includes removing the diffraction image of one or more of the pairs by applying a predefined intensity threshold.

In some embodiments, the sample has first and second surfaces facing one another, at least a given structure of the structures has one or more walls formed between the first and second surfaces and defining a cavity, and the first property of at least one of the predefined outputs is indicative of a shape of the one or more walls.

In some embodiments, the cavity of the given structure is extending between the first and second surfaces, the cavity having a center line (CL) that runs in parallel to the walls and is located at an equidistance from the walls, and the training dataset includes: (i) a first diffraction image formed responsively to directing the incident X-ray beam at a first angle and having a predefined size at a given plane, and (ii) a second diffraction image formed responsively to directing the incident X-ray beam at a second angle, different from the first angle, the second diffraction image also having the predefined size at the given plane, and training the NN includes: (i) producing a multi-layered diffraction image including the first and second diffraction images in first and second layers, respectively, and having the predefined size at the given plane, and (ii) applying the NN to the multi-layered diffraction image.

In other embodiments, the walls of the given structure are asymmetric along an axis of the sample, and providing the NN with the given predefined output includes providing the NN with an indication of a CL shift (CLS).

In yet other embodiments, the given structure includes a multi-tier structure including a first layer including a first cavity having a first CL, and a second layer formed over the first layer and including a second cavity having a second CL, and, the first and second CLs are intended to be aligned along the axis of the sample, and training the NN includes: (i) using a plurality of additional diffraction images formed responsively to directing the incident X-ray beam at multiple angles, respectively, for producing an additional multi-layered diffraction image having the predefined size at the given plane, and (ii) applying the NN to the additional multi-layered diffraction image for checking whether the estimated output includes at least one of: (a) the CLS in at least one of the first and second CLs, and (b) a joint shift (JS), which is a distance between the first and second CLs, which is measured along an interface between the first and second layers.

There is additionally provided, in accordance with an embodiment of the present invention, a system for training a neural network (NN), the system includes:

an interface, which is configured to receive a training dataset including:
(a) one or more pairs of: (i) a diffraction image indicative of X-ray photons diffracted from one or more structures formed in a sample responsively to directing an incident X-ray beam at an angle relative to the sample, and (ii) a label, including a first parameter indicative of at least a first property of the one or more structures, and a second parameter indicative of at least a second property of the incident X-ray beam, and
(b) one or more predefined outputs for the one or more pairs, respectively; and a processor, which is configured to train the NN to obtain the predefined outputs by: (i) applying the NN to at least a given pair of the pairs, and (ii) responsively to receiving from the NN an estimated output of the given pair, the processor is configured to provide the NN with a given predefined output of the predefined outputs that corresponds to the given pair.

There is further provided, in accordance with an embodiment of the present invention, a method for performing X-ray analysis, the method includes:

receiving a first diffraction image having a first intensity, the first diffraction image being indicative of first X-ray photons diffracted from one or more structures formed at a site of a sample, responsively to directing an incident X-ray beam at a first angle relative to a surface of the sample.

A neural network (NN) including a trained model, which is pre-trained based on one or more second diffraction images, is applied to the first diffraction image, and One or more inferred parameters are received from the NN, the one or more inferred parameters are based on the first diffraction image and the trained model, and are indicative of at least a recommended angle for directing the incident X-ray beam to the site in a subsequent measurement.

In some embodiments, receiving the inferred parameters includes receiving a measured parameter of at least one of the structures based on the first diffraction image. In other embodiments, a measurement quality when directing the incident X-ray beam at the recommended angle is higher than the measurement quality when directing the incident X-ray beam at the first angle. In yet other embodiments, the measurement quality includes at least one of: (i) repeatability, (ii) reproducibility, (iii) accuracy, and (iv) sensitivity.

In some embodiments, receiving the one or more inferred parameters includes, in response to applying the NN: (i) receiving, within a first time interval, first inferred parameters when directing the incident X-ray beam at the recommended angle, and (ii) receiving, within a second time interval, second inferred parameters when directing the incident X-ray beam at the first angle, and the first time interval is shorter than the second time interval.

In other embodiments, the first and second diffraction images have a radial symmetry, and, a first set of the first and second diffraction images is produced in cartesian coordinates, and a second set of the first and second diffraction images is produced in polar coordinates, and applying the NN includes: (i) applying to the first set, a first convolutional NN (CNN) having a first number of convolutional layers, and (ii) applying to the second set, a second CNN having a second number of convolutional layers, different from the first number.

In yet other embodiments, at least one of the inferred parameters includes a measured parameter, the sample has first and second surfaces facing one another, and at least a given structure of the structures has one or more walls formed between the first and second surfaces and defining a cavity, and a first property of at least one of the measured parameters is indicative of a shape of the one or more walls.

In some embodiments, the cavity of the given structure is extending between the first and second surfaces, the cavity having a center line (CL) that runs in parallel to the walls and is located at an equidistance from the walls, and, the second diffraction images include: (i) a first image formed responsively to directing the incident X-ray beam at a first angle and having a predefined size at a given plane, and (ii) a second image formed responsively to directing the incident X-ray beam at a second angle, different from the first angle, the second image also having the predefined size at the given plane, and including training the NN by: (i) producing a multi-layered diffraction image including the first and second images in first and second layers, respectively, and having the predefined size at the given plane, and (ii) applying the NN to the multi-layered diffraction image.

In other embodiments, the first diffraction image includes a first multi-layered diffraction image.

In some embodiments, the walls of the given structure are asymmetric along an axis of the sample, and receiving from the NN one or more inferred parameters includes receiving an indication of a CL shift (CLS).

In other embodiments, the given structure includes a multi-tier structure including a first layer including a first cavity having a first CL, and a second layer formed over the first layer and including a second cavity having a second CL, and, the first and second CLs are intended to be aligned along the axis of the sample, and including: (i) using a plurality of additional diffraction images formed responsively to directing the incident X-ray beam at multiple angles, respectively, for producing an additional multi-layered diffraction image having the predefined size at the given plane, and (ii) applying the NN to the additional multi-layered diffraction image for checking whether at least one of the inferred parameters includes at least one of: (a) the CLS in at least one of the first and second CLs, and (b) a joint shift (JS), which is a distance between the first and second CLs, which is measured along an interface between the first and second layers.

There is additionally provided, in accordance with an embodiment of the present invention, a system for performing X-ray analysis, the system includes:

an interface, which is configured to receive a first diffraction image having a first intensity, the first diffraction image being indicative of first X-ray photons diffracted from one or more structures formed at a site of a sample, responsively to directing an incident X-ray beam at a first angle relative to a surface of the sample; and a processor, which is configured to: (i) apply, to the first diffraction image, a neural network (NN) including a trained model, which is pre-trained based on one or more second diffraction images, and (ii) receive from the NN one or more inferred parameters, which are based on the first diffraction image and the trained model, and are indicative of at least a recommended angle for directing the incident X-ray beam to the site in a subsequent measurement.

There is further provided, in accordance with an embodiment of the present invention, a method for performing X-ray analysis, the method including receiving a first diffraction image having a first intensity, the first diffraction image being indicative of first X-ray photons diffracted from one or more structures formed at a site of a sample, responsively to directing an incident X-ray beam at a first angle relative to a surface of the sample. A neural network (NN) is applied to the first diffraction image, the NN includes a trained model, which is pre-trained based on one or more second diffraction images obtained responsively to directing the incident X-ray beam at one or more angles relative to a surface of the sample, respectively. One or more inferred parameters are received from the NN, the one or more inferred parameters are based on the first diffraction image and the trained model, and are indicative of one or more measured parameters of at least one of the structures based on the first diffraction image.

In some embodiments, a measurement quality of the one or more inferred parameters includes at least one of: (i) repeatability, (ii) reproducibility, (iii) accuracy, and (iv) sensitivity, of the one or more measured parameters. In other embodiments, the sample has first and second surfaces facing one another, and at least a given structure of the structures has one or more walls formed between the first and second surfaces and defining a cavity, and a first property of at least one of the measured parameters is indicative of a shape of the one or more walls.

In some embodiments, the cavity of the given structure is extending between the first and second surfaces, the cavity having a center line (CL) that runs in parallel to the walls and is located at an equidistance from the walls, and the second diffraction images include: (i) a first image formed responsively to directing the incident X-ray beam at a first angle and having a predefined size at a given plane, and (ii) a second image formed responsively to directing the incident X-ray beam at a second angle, different from the first angle, the second image also having the predefined size at the given plane, and including training the NN by: (i) producing a multi-layered diffraction image including the first and second images in first and second layers, respectively, and having the predefined size at the given plane, and (ii) applying the NN to the multi-layered diffraction image.

In other embodiments, the first diffraction image includes a first multi-layered diffraction image. In yet other embodiments, the walls of the given structure are asymmetric along an axis of the sample, and receiving from the NN one or more inferred parameters includes receiving an indication of a CL shift (CLS).

In some embodiments, the given structure includes a multi-tier structure including a first layer including a first cavity having a first CL, and a second layer formed over the first layer and including a second cavity having a second CL, and, the first and second CLs are intended to be aligned along the axis of the sample, and including: (i) using a plurality of additional diffraction images formed responsively to directing the incident X-ray beam at multiple angles, respectively, for producing an additional multi-layered diffraction image having the predefined size at the given plane, and (ii) applying the NN to the additional multi-layered diffraction image for checking whether at least one of the inferred parameters includes at least one of: (a) the CLS in at least one of the first and second CLs, and (b) a joint shift (JS), which is a distance between the first and second CLs, which is measured along an interface between the first and second layers.

There is further provided, in accordance with an embodiment of the present invention, a system for performing X-ray analysis, the system includes:
an interface, which is configured to receive a first diffraction image having a first intensity, the first diffraction image being indicative of first X-ray photons diffracted from one or more structures formed at a site of a sample, responsively to directing an incident X-ray beam at a first angle relative to a surface of the sample; and
a processor, which is configured to: (i) apply, to the first diffraction image, a neural network (NN) including a trained model, which is pre-trained based on one or more second diffraction images, and (ii) receive from the NN one or more inferred parameters, which are based on the first diffraction image and the trained model, and are indicative of a measured parameter of at least one of the structures based on the first diffraction image.

The present invention will be more fully understood from the following detailed description of the embodiments thereof, taken together with the drawings in which:

BRIEF DESCRIPTION OF THE DRAWINGS

FIG. 2 is a schematic illustration of diffraction images produced in response to directing incident X-ray beams to a sample, in accordance with an embodiment of the present invention;

FIG. 3 is a block diagram that schematically illustrates a process sequence for training a neural network (NN), and subsequently, using the NN for improving X-ray analysis of the sample of FIG. 2, in accordance with an embodiment of the present invention;

DETAILED DESCRIPTION OF EMBODIMENTS

Overview

Figure 1:
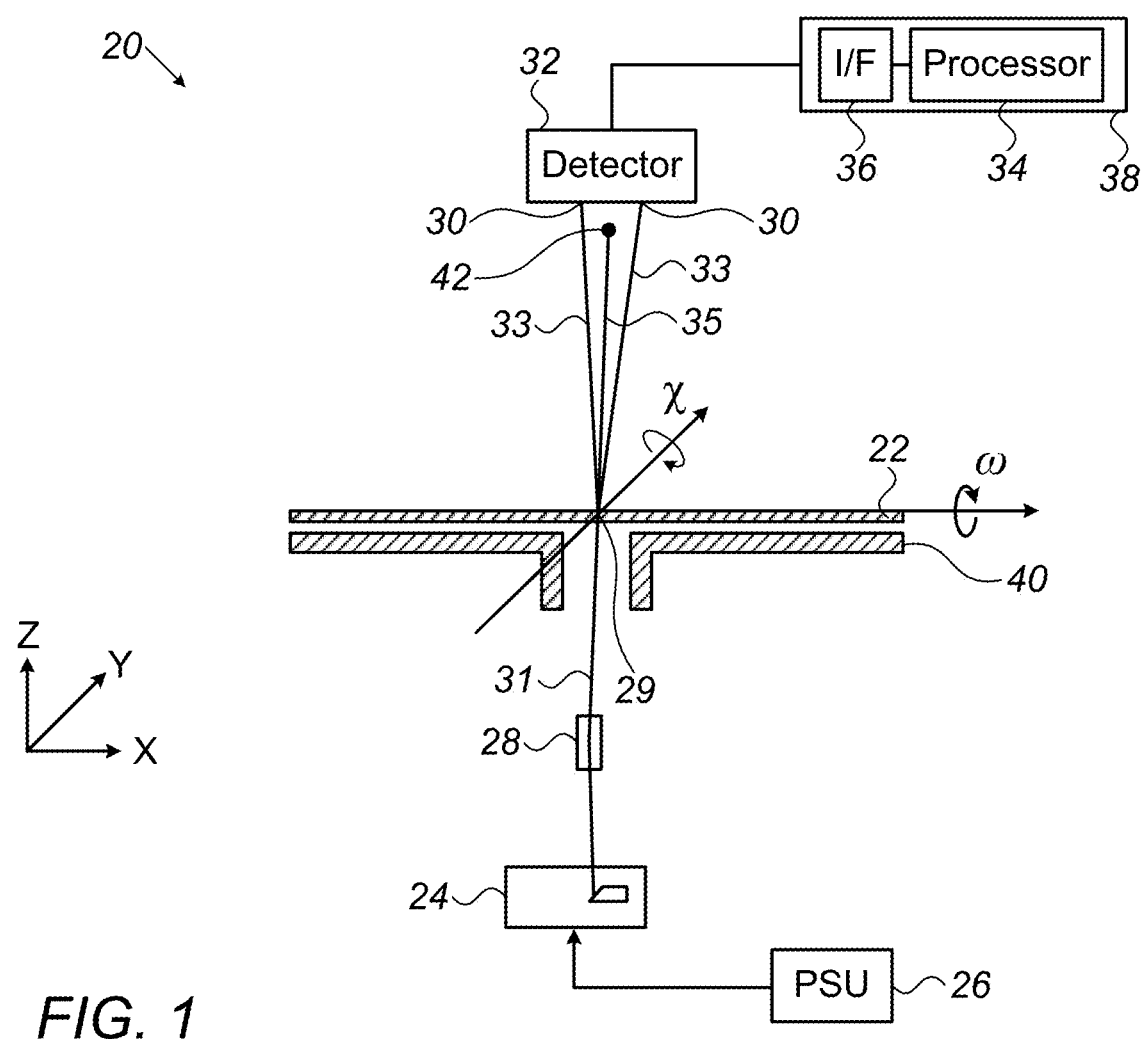
FIG. 1 is a schematic illustration of key elements of a small-angle X-ray scattering (SAXS) system, in accordance with an embodiment of the present invention.

Scatterometry techniques may be used to measure geometrical dimensions of the features in one or more periodic arrays formed in or on various types of semiconductor devices and test structures. X-ray techniques, such as small-angle X-ray scattering (SAXS), typically apply X-rays whose wavelengths are on the order of an angstrom, are suitable for measuring High Aspect Ratio (HAR) features such as HAR holes, trenches between lines, or any other types of HAR structures having any suitable size and shape, which are all fabricated in semiconductor wafers. Measuring the geometrical properties of features is carried out using estimation techniques that are based on analyzing the intensity of the X-rays scattered from the sample, also referred to herein as diffraction images.

In principle, an alignment procedure is required. The alignment process includes tilting the wafer at multiple angles relative to the incident beam, and determining the preferred angle between the incident X-ray beam and the wafer surface, so as to obtain the optimized diffraction images that can yield the best measurements and/or X-ray analysis of HAR structures of interest formed in the wafer.

In the description that follows, for the sake of clarity, the terms "measure", "determine" and "estimate" are used interchangeably. Furthermore, the terms "trench" and "line" are used interchangeably, and refer to HAR lines and trenches that are arranged in the one or more periodic arrays.

In other words, (i) the HAR lines and trenches are arranged alternately in at least a first array among the periodic arrays, and (ii) the HAR holes are arranged in a periodic structure in at least a second array among the periodic arrays. It is noted that in a typical device, the first array is formed in a first layer of the device, and the second array is formed in a second layer of the device, different from the first layer. But some devices, such as but not limited to three-dimensional (3D) NAND flash memory devices, one or more layers may comprise a combination of (i) lines and trenches, and (ii) holes having a HAR structure.

In addition to the alignment process, a regression model is produced (typically by an expert engineer) based on the nominal features (e.g., dimensions layered structure and other features) of the HAR structure and a predefined process window that defines the range of various input parameters. Moreover, an expert engineer is required for integrating the above in a production recipe of an X-ray system used to carry out the X-ray analysis.

Typically, the X-ray analysis system comprises a processor that: (i) receives, from one or more X-ray detectors, signals indicative of photons emitted (typically diffracted, i.e. scattered from a periodic array) from the wafer in response to a physical interaction between the incident X-ray beam and (HAR structures of) the wafer, (ii) produces a diffraction image consisting of a 2D array of scattered intensity values, and (iii) applies the regression model to the diffraction image for receiving the output of the X-ray analysis (e.g., one or more measurements of one or more HAR structures).

It is noted that the processes described above (e.g., alignment, production of regression model, and analysis of the output) requires at least an expert engineer and/or operator, and expensive operational resources, such as but not limited to time of X-ray system, and wafers having HAR structures representing the process window of interest.

Moreover, the output may comprise data that is distorted due to unexpected process variations, and undesired noise related to the X-ray system and the interaction between the incident beam and the sample. For example, background scattering from slits of the system, or from underlying structures of the sample. In such cases, additional resources are required in order to determine whether the output reflects a physical distortion in the HAR structures, or caused by undesired artifacts of the system and/or between the system and the wafer.

Embodiments of the present invention that are described below provide techniques for improving the automation, throughput and quality of X-ray analysis using a SAXS system and trained models (e.g., deep leaning algorithms) implemented in neural networks (NN), such as convolutional NNs (CNNs). Moreover, the disclosed techniques reduce the resources described above, which are associated with developing and operating such recipes in an X-ray analysis system.

In some embodiments, an X-ray analysis system comprises: (i) an X-ray source and optics configured to direct an incident (X-ray) beam to a wafer having HAR structures in question, (ii) a suitable mount (e.g., a stage and a chuck) configured to move and rotate the wafer relative to the incident beam, (iii) a detector assembly configured to produce a signal indicative of the intensity distribution of photons diffracted from the wafer in response to a physical interaction between the incident beam and the HAR structures of interest, and (iv) a processing unit comprising a processor, interface, memory and other computational capabilities. In the context of the present disclosure and in the claims, the term processor is used (in brevity) to describe the entity that carries out the operations of the processing unit. The above components and the operation of the X-ray analysis system is described in detail in FIG. 1 below.

In some embodiments, the system comprises a convolutional neural network (CNN), also referred to herein as a NN, for brevity. Note that the structure and operations of two suitable CNNs are described in detail in FIGS. 4 and 5 below.

In some embodiments, the processor is configured to produce a model of the HAR structures intended to be analyzed by the system. Moreover, the processor is configured to one or more datasets for training the NN, the datasets may comprise synthetic data, real (e.g., measurement-based) data, and a combination thereof. In essence, the datasets are produced based on (i) modeling and simulations of the nominal features of the HAR structures, (ii) measurements of samples of the HAR structures using X-ray systems and other suitable types of measurement and analysis systems (e.g., focused ion beam, transmission electron microscope, and scanning electron microscope), and (iii) modeling and simulations of systematic and random sources of noise, such as but not limited to: (a) structural variations in the HAR structures, (b) noise related to the system and to the interaction between the system and the wafer, and other sources of noise. Techniques for producing the training datasets are described in detail, for example, in FIGS. 2 and 3 below.

In some embodiments, the processor is configured to store one or more thresholds indicative of the accuracy level required from the CNN during a training stage. The thresholds are described in detail in FIGS. 3 and 6 below. Once the CNN meets one or more conversion criteria (e.g., using the aforementioned thresholds), the training has been concluded and processor may perform a verification step in order to ensure the CNN is sufficiently trained and ready for an inference stage in both process engineering and production environments.

In some embodiments, based on signals received from the detector assembly and using the techniques described above, the processor is configured to produce a first diffraction image having a first intensity distribution. Note that the first diffraction image is indicative of first X-ray photons diffracted from one or more HAR structures at a predefined site of the wafer, and the first X-ray photons are diffracted responsively to directing the incident X-ray beam at a predefined (referred to herein as a first) angle relative to a surface of the wafer.

In some embodiments, the processor is configured to apply the trained NN to the first diffraction image, and responsively, receive from the NN one or more inferred parameters, which are based on the first diffraction image and a trained (e.g., deep learning) model of the NN.

In some embodiments, the inferred parameters are indicative of at least one of (i) a recommended second angle, different from the first angle, and (ii) one or more measurements of features of the HAR structures. The second angle is recommended for directing the incident X-ray beam to the same site of the wafer in a subsequent measurement, so as to improve the quality of a subsequent second diffraction image, and thereby, improve the quality of the X-ray analysis (e.g., measurement) carried out on the HAR structures of interest.

Additional embodiments related to improving the: (i) quality of the X-ray analysis (e.g., accuracy or precision of the measurements), (ii) throughput of the training or inference stages, (iii) analysis of variations along a vertical axis of the HAR structures, (iv) analysis of overlay between stacked HAR structures, and other embodiments, are described in detail in FIGS. 2-7 of the detailed description below.

The disclosed techniques improve the quality and productivity of X-ray analysis processes carried out by X-ray analysis systems. Moreover, the disclosed techniques may be applied, mutatis mutandis, to other suitable sorts of measurement and analysis systems used for analyzing structures of semiconductor devices and other suitable sorts of devices.

System Description

FIG. 1 is a schematic illustration of a small-angle X-ray scattering (SAXS) system 20, in accordance with an embodiment of the present invention. In some embodiments, system 20 is configured to measure dimensions of structures on a sample using scatterometry techniques, as will be described hereinbelow.

In some embodiments, the sample may comprise a semiconductor wafer 22 having, inter alia, arrays of high aspect ratio (HAR) or other features etched into wafer 22 or formed thereon. In alternative embodiments, system 20 is further configured for measuring dimensions of other suitable structures formed on wafer 22. In the context of the present disclosure and in the claims, the term "high aspect ratio (HAR)" typically refers to an aspect ratio higher than about 10, for example, in a dynamic random-access memory (DRAM) device, and in a three-dimensional (3D) NAND flash memory device, the aspect ratios may be greater than about 50:1 and greater than about 100:1, respectively.

In some embodiments, system 20 comprises an excitation source, such as an X-ray source 24, which is typically driven by a high-voltage power supply unit (PSU) 26. In some embodiments, source 24 emits an X-ray beam 31 having a suitable energy to penetrate through wafer 22. In the present example, X-ray beam 31 passes through X-ray optics 28 that may comprise suitable diffractive elements, such as crystals or multilayer mirrors or apertures (slits) configured to direct X-ray beam 31 to impinge on a small region 29 of the surface of wafer 22. Additional components and properties of a SAXS system, such as system 20, are described in detail, for example, in the aforementioned U.S. Pat. No. 10,684,238, whose disclosure is incorporated herein by reference.

In an embodiment, wafer 22 is mounted on a movable platform, such as an X-Y-χ-ω stage 40, configured to move wafer 22 relative to X-ray beam 31 in the X and Y directions, as well as applying rotation φ (not shown) about an axis normal to the surface of wafer 22 (e.g., the Z-axis), rotation χ about the Y-axis of the wafer and rotation ω about the X axis of the wafer. Note that χ and ω are both parallel to the surface of wafer 22 but orthogonal to one another, whereas φ rotates about the normal to the surface of wafer 22, as described above.

In an embodiment, stage 40 is designed as an open frame so as to allow incident beam 31 to directly impinge on the surface of wafer 22 at region 29, as described above. More specifically, there is no material over most of wafer 22 which is supported and a few localized sites around the edge of wafer 22, so as to allow measurements as close as possible to the edge of wafer 22, and thereby, minimizing the size of an edge exclusion region. The beam passes through the lower surface of wafer 22 (facing source 24) and is scattered from an array of High Aspect Ratio (HAR) structures formed in the upper surface of wafer 22 (opposite the lower surface).

In some embodiments, incident beam 31 may impinge on region 29 normal to the lower surface of wafer 22, or at any other suitable angle. A portion of incident beam 31 is typically absorbed as it traverses the sample and a transmitted beam 35 exits the upper surface of wafer 22 in the same direction of the incident beam. Additional beams 33 are scattered from the arrays of the aforementioned structures, and are emitted (e.g., diffracted) from the upper surface of wafer 22 as shown in FIG. 1.

In some embodiments, system 20 comprises a detector assembly 32, which is configured to detect the X-ray intensity distribution of beams 33 impinging at one or more regions 30 on the surface of detector assembly 32. In an embodiment, system 20 comprises a beam-stopper 42 made from an X-ray opaque or partially opaque material, which is located between wafer 22 and assembly 32, and is configured to occlude at least part of beam 35 from irradiating detector assembly 32. Example implementations of beam-stopper 42 are described in detail, for example, in U.S. Pat. No. 10,684,238 to Krokhmal et. al, whose disclosure is incorporated herein by reference.

In some embodiments, detector assembly 32 may have a flat shape, or may have any other suitable shape, such as an arc angled toward beams 33 and 35. Detector assembly 32 may comprise a single detector, or an array of detectors arranged in any suitable configuration. The beam detectors may have a two-dimensional (2D) configuration or a one-dimensional (1D) configuration, and are capable of counting X-ray photons. Detector assembly 32 is further configured to produce a signal (e.g., an electrical signal) indicative of the number of detected X-ray photons and the location of each detected detector assembly 32 photon on the surface of detector assembly 32, and system 20 transfers the signal to a signal processing unit 38. The detector may have the ability to measure only X-ray photons within a certain energy range so as to reduce background noise, for example from X-ray fluorescence and cosmic rays.

In some embodiments, signal processing unit 38 comprises a processor 34, which is configured to process the signal received from assembly 32, and an interface 36 for exchanging electrical signals between assembly 32 and processor 34.

In some embodiments, processor 34 is configured to acquire data from assembly 32 so as to determine a scattered intensity distribution of the X-ray photons captured by the detector(s) of assembly 32. In an embodiment, processor 34 is configured to use the intensity distribution measured at one or more incident beam angles to estimate the dimension or orientation of one or more geometrical structures on wafer 22. In this embodiment, processor 34 is configured to calculate intensity distribution from a structural model of the features whose geometric parameters, such as height and width (also referred to herein as critical dimension—CD) are automatically refined, so as to minimize a numerical difference between the measured and calculated intensity distributions. Additional parameters describing the arrangement of the features within the array, such as the distance between adjacent features (pitch) can also be estimated using a suitable structural model.

Processor 34 typically comprises a general-purpose computer or network of computers, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In some embodiments, processor 34 may comprise any suitable type of a central processing unit (CPU), or a graphical processing unit (GPU), or a tensor processing unit (TPU) or any other suitable type of an application-specific integrated circuit (ASIC). All the above processing units are configured, inter alia, to accelerate deep learning workloads in a neural network described below. Additionally, or alternatively, system 20 may comprise any suitable type of an ASIC and/or a digital signal processor (DSP) and/or any other suitable sort of processing unit configured to carry out at least part of the processing of data in system 20.

In an embodiment, the software is configured to perform multiple tasks, such as controlling detector assembly 32, as well as data acquisition and data analysis.

In the example of FIG. 1, stage 40 can be moved in: (i) at least one of X, Y (and optionally Z) directions of the XYZ coordinate system, and (ii) may also be rotated in χ and ω direction, so as to scan and analyze region 29 of wafer 22. In alternative embodiments, wafer 22 is mounted on a suitable stationary fixture (instead of stage 40) while source 24, optics 28 and assembly 32 are moved, so as to scan region 29 by X-ray beams 31.

Additionally, or alternatively, system 20 is further configured to capture and process X-rays scattered from wafer 22 using other beam-wafer interactions, such as reflection, and/or diffraction. Such multi-functional systems are described, for example, in U.S. Pat. Nos. 6,381,303 and 6,895,075, which are incorporated herein by reference.

The example of FIG. 1 refers to a specific configuration of an X-ray system. This configuration, however, is chosen purely for the sake of conceptual clarity. For example, system 20 may further comprise additional modules, such as an optical microscope (not shown) for assisting in the navigation of stage 40 to region 29 and in reviewing the structures on wafer 22. In alternative embodiments, the disclosed techniques can be used, mutatis mutandis, in various other types of X-ray systems or analyzing modules known in the art, comprising any suitable excitation source, power source, focusing optics and detection system, may be used for implementing the methods described herein.

Producing Diffraction Images Based on Photons Scattered from High Aspect Ratio (HAR) Features FIG. 2 is a schematic illustration of diffraction images 50 and 51 produced in response to directing incident X-ray beam 31 to wafer 22, in accordance with an embodiment of the present invention. In the present example, X-ray beam 31 is directed along an axis 37 at an angle 47 relative to an axis 7 that is perpendicular to an upper surface 41 and a lower surface 39 of wafer 22. Note that surfaces 39 and 41 are typically approximately parallel with one another, and incident X-ray beam 31 is approximately parallel (or has some intended variations) to axis 7, which is perpendicular to surfaces 39 and 41. Thus, angle 47 is typically an acute angle.

In the context of the present disclosure and in the claims, the terms "about" or "approximately" for any relative or absolute numerical values or ranges indicate a suitable dimensional tolerance that allows the part or collection of components to function for its intended purpose as described herein.

In some embodiments, wafer 22 comprises arrays of repetitive two-dimensional (2D) HAR structures, such as lines or trenches (not shown), or three-dimensional (3D) HAR structures, such as holes 44 or pillars that nominally have an approximately cylindrical shape. In the context of the present disclosure and in the claims, the term "aspect ratio" refers to the ratio between the depth and width (e.g., diameter in the case of a circular hole) of the feature in question, e.g., holes 44.

For example, (i) the aforementioned lines and trenches having a HAR structure are arranged alternately in at least a first array among the periodic arrays, and (ii) holes 44 (which also have a HAR structure as described above) are arranged in a periodic structure in at least a second array among the periodic arrays. In the example of FIG. 2, only the second layer is presented, but in other examples, another layer may comprise any suitable combination of HAR (i) lines and trenches, and (ii) holes, arranged in a periodic array.

In some embodiments, each array of holes 44 typically comprises thousands or millions of holes 44, at least some of holes may have structural variations described below. Note that typically the structural variations between holes 44 may have a different nature between the arrays compared to that within the arrays. More specifically, the structural variations typically comprise random variation within (i.e., inside) the array (e.g., between at least two of holes 44 within the same periodic array), around an average value, whereas the structural variation between different arrays of the same type of structures, can be more systematic. It is noted that structural variations within the array may also have a systematic component, for example, due to variations in the direct writing process of structures in lithography masks of the structures in question (e.g., holes 44), but the systematic component is typically substantially larger between the arrays, e.g., due to process variations in almost every process step, including lithography and mask making. Based on the above, the non-uniformity between adjacent holes 44 is typically smaller between closed neighbors within a given array, compared to a larger non-uniformity between holes 44 of different arrays.

In the example of FIG. 2, some of the arrays are separated by discontinuity signs 21. Note that the structural variations described below are presented by way of example, and typically only one or two of the following variations may occur in a single wafer. FIG. 2 presents holes 44b, which are indicative of the nominal structure of the holes 44 of wafer 22. Holes 44b have a nominal diameter 45b (e.g., in the XY plane of surface 41, note that Y-axis is dashed for being out of the XZ plane presented) and a right angle 48 between an axis 43a of holes 44b and surface 41 (i.e., axis 43a is approximately perpendicular to surface 41 and parallel to axis 7 described above).

In some embodiments, holes 44a, 44c, 44d, 44e and 44f are shown for presenting some examples of the aforementioned structural variations that may undesirably occur while producing holes 44. Note that these are just examples and other sort of systematic and statistical structural variations may occur. Moreover, as written above, typically only one or two of such structural variations may occur on the same wafer 22.

More specifically, (i) hole 44a has a diameter 45a different from (e.g., larger than) the nominal diameter (e.g., diameter 45b), (ii) hole 44c has a barrel shape or any other shape different from that of holes 44b. Additional specific examples of a structural variation may comprise (iii) hole 44d has a trapezoid shape and may have substantially difference between upper diameter 45c and a lower diameter 46, wherein at least one of diameters 45c and 46 may differ from the nominal diameter described above, and (iv) holes 44f have a diameter 45d. Note that the nominal holes (e.g., holes 44b) may also have a trapezoid shape, and the variation may occur, for example, due to asymmetry in a sidewall 25 of hole 44d, which may cause a centerline shift (CLS) described in more detail below. Moreover, another specific examples of structural variations may comprise (iv) difference in the height or depth of the hole, for example, a height 52 of hole 44e is different from (e.g., smaller than) that of holes 44b, and (v) holes 44f whose longitudinal axis 43b tilted at an angle 49 defined between axes 43b and 7, and therefore, is not perpendicular to surface 41. In the context of the present disclosure and in the claims, the terms height and depth are used interchangeably. Additionally, or alternatively, wafer 22 may have other structural variations, such as roughness along the sidewall (e.g., along the Z-axis) and/or in the circumference (e.g., within the XY plane), ellipticity, and angular orientation of holes 44 any of which may vary with depth along the features.

Note that in the context of the present disclosure and in the claims, the terms "height" and "depth" of a hole 44 or a trench are used interchangeably and refer to the size of the respective trench or hole along the Z-axis of the samples, e.g., wafer 22. Moreover, the term "hole" refers to any suitable shape of a closed contour, such as but not limited to a round circle and/or an ellipse. Thus, the terms "diameter" and "width" are used interchangeably, and refer to the dimension of the hole in any selected XY plane of the sample. Furthermore, the terms "trench" and "hole" are also referred to herein as a "cavities" or grammatical variations thereof, wherein the hole comprises a two-dimensional (2D) cavity and the trench typically comprises a one-dimensional (1D) cavity.

In some embodiments, diffraction images 50 and 51 produced by system 20, in response to directing incident X-ray beams 31 to the areas having holes 44b and holes 44f, respectively. In the present example, diffraction image 50 has different, typically higher, intensity and symmetry compared to that of diffraction image 51, which are indicative of: (i) the structural variations described above, and (ii) the difference between angle 47 and angles 48 and 49. More specifically, the inventors found that improved measurement performance (e.g., best precision and/or sensitivity) are obtained when the intensity of the respective diffraction image is different (typically higher), which is obtained when the axis of the measured hole (e.g., axes 43a and 43b) is parallel to axis 37 of incident beam 31.

Improving Image Acquisition and Measurement Performance Using Neural Networks

FIG. 3 is a block diagram that schematically illustrates a process sequence 54 for training a neural network (NN) 55, and subsequently, using NN 55 for improving X-ray analysis of holes 44 in wafer 44, in accordance with an embodiment of the present invention.

In some embodiments, NN 55 comprises any suitable type of NN, such as but not limited to convolutional NNs (CNNs) 55 and 77 whose structures and functionalities are described below in detail in FIGS. 4 and 5, respectively. CNNs 55 and 77 may be implemented in processor 34 and/or in other processing devices (not shown) implemented in processing unit 38 or in any other suitable computer (not shown) connected to or included in system 20. In the context of the present disclosure, the term neural network refers to any suitable artificial intelligence technique, such as but not limited to deep learning (DL) algorithm(s) and/or machine learning (ML) algorithm(s), which is implemented in hardware, software, or a suitable combination thereof.

In some embodiments, process sequence 54 comprises major steps 1, 2 and 3, each of which comprising one or more operations described herein. In the following description, the operations are carried out by processor 34, but in other embodiments, one or more of the operations of process sequence 54 may be carried out using any other suitable type of processing device(s) and software, as described above.

At a data generation step 1, processor 34 is configured to receive reference data 56, e.g., (i) X-ray patterns obtained from holes 44 of one or more wafers 22 or suitable reference wafers, (ii) data based on cross sections of holes 44, and (iii) other sort of reference data received from any other suitable source. Note that processor 34 is configured to receive and/or produce at least some of reference data 56, for example, based on signals received from detector assembly 32.

In some embodiments, processor 34 is configured to produce labels 60, which are indicative of and associated with parameters 57 of (i) system 20 (and signal acquisition parameters thereof), (ii) measurements performed by system 20 on one or more wafers 22 (or other suitable wafers) having holes 44, and (iii) structural parameters (e.g., diameter(s), height, and roughness) of holes 44.

In some embodiments, the data generation step as described above may be optional, for example, in case all the training data (e.g., reference data 56 and labels 60) are completely synthetic and are generated using suitable simulations.

In some embodiments, processor 34 is configured to apply at least some of parameters 57 to a suitable type of synthetic data generator (SDG) referred to herein as an X-ray solver 58, such as but not limited to the NanoDiffract for XCD (NDX) product, which is typically a software product supplied by Onto Innovation, 1550 Buckeye Drive Milpitas, CA 95035. X-ray solver 58 applied a regression from a physical model. In some embodiments, based on parameters 57, X-ray solver 58 is configured to produce optionally realistic and typically synthetic X-ray scattering data 59, which is inserted into NN 55 as training and/or validation data 62. In some embodiments, labels 60 may also be used for training NN 55.

In some embodiments, the realistic, synthetic data generation process may comprise the following operations:
(a) create a synthetic array 63 of multiple holes 44 representing the nominal layout and structure of holes 44 (e.g., holes 44b) formed in wafer 22. In the present example, the structure of array 63 is based on a nominal array of holes of a 3D NAND device, but in other embodiments, array 63 of multiple holes 44 may be based on (a nominal or any other) structure of any other device, such as a suitable type of a DRAM device. In the present example, approximately twelve holes 44 of array 63 will be used by processor 34 for modeling real structures (including the systematic and random structural variations described above) produced on one or more wafers 22.

(b) Based on reference data 56, processor 34 is configured to determine bounds of structural variations (e.g., imperfections), such as but not limited to variations in diameters of two or more holes, and the roughness described above, and a center line shift that will be described in more detail below.

(c) Subsequently, processor 34 is configured to generate a training data set for NN 55. The training data set comprising nominal profiles lying within a predefined process window for producing holes 44 of the respective (e.g., 3D NAND) device. Simultaneously, processor 34 may be configured to use variation parameters of the nominal profiles (such as but not limited to tilt angle 49 of FIG. 2 above) for labeling the generated patterns. In some embodiments, processor 34 is configured to use the bounds of the structural variations (also referred to herein as structural noise), to randomly distort each parameter of the nominal profile of every hole 44 of array 63, so as to obtain a realistic diffraction pattern. Moreover, processor 34 is configured to estimate system-related noise, which is a physical noise originating from the discrete nature of counting X-ray photons. This noise is also referred to herein as Poisson noise or shot noise, and instrumental artifacts of system 20 (e.g., noise caused by background scattering from slits of system 20, and other sorts of electrical and/or electro-mechanical interactions within system 20), and to add this system-related noise to complete the process of realistic data generation. For example, the shot noise may result from statistical fluctuations in the intensity of incident beam 31, which is added by processor 34 to obtain the diffraction patterns shown, for example, in diffraction image 61b in accordance with a Poisson distribution of the intensity variation of incident beam 31.

In the example of FIG. 3, data 59 comprises synthetic data, such as data 59b comprising diffraction image 61b. Additionally, data 59 may comprise real data, such as data 59a comprising diffraction image 61a. In validation processes, the inventors compared between real and simulated (synthetic) diffraction images of holes 44 produced using similar structural variations and noise, and obtained high fidelity between real and simulated diffraction images, such as between diffraction image 61a and 61b. Note that some parameters, such as but not limited to average width, tilt angle altered with depth (as will be described in more detail in FIG. 7 below), and hole-to-hole variation within the same array, may have different degrees of variations within the array, between arrays, and at different locations on wafer 22. In some embodiments, X-ray solver 58 is configured to incorporate these parameters into the modeling while producing the synthetic diffraction images of holes 44 and other sort of HAR structures in question.

In some embodiments, the simulated synthetic diffraction images may be used for training NN 55 across a large process window that may comprise variations in a large number of parameters, such as but not limited to width, depth, and x and y components of the tilt angle of holes 44.

Note that at least some of the parameters are applicable, mutatis mutandis, to other suitable HAR structures that may be produced in wafer 22 or in another wafer having structures of a 3D NAND device or a DRAM device, or any other suitable type of device having HAR structures of interest.

In some embodiments, processor 34 is configured to produce synthetic arrays of non-identical holes 44, and the geometry of each hole 44 may be varied independently. In the present example, the number of holes 44 in the simulated array is approximately equal to the number of holes 44 contained in the coherence volume of a real wafer 22 that is irradiated by X-ray beam 31 and having a known cross-sectional area.

In some embodiments, at least one of and typically all of the diffraction images comprise synthetic diffraction images, which are produced based on the respective labels 60, and are calculated using a Born approximation based on a kinematical scattering theory. One example of applying the kinematical scattering theory to CD profiling (XCD) is described in "An Assessment of Critical Dimension Small Angle X-ray Scattering Metrology for Advanced Semiconductor Manufacturing," which is a PhD thesis of Charles M. Settens, at the university of Albany, State University of New York (2015), whose disclosure is incorporated herein by reference.

At a NN training and validation step 2, processor 34 is configured to use training data 62, such as diffraction images 61a and 61b, and labels 60 for training NN 55. For example, processor 34 is configured to train and validate the DL algorithms of NN 55 by: (i) inserting diffraction images 61a and 61b as input parameters, (ii) receiving from NN 55 output parameters, such as a width measurement of holes 44 estimated by NN 55, and (iii) based on the label of the corresponding holes 44, performing supervised learning by feeding back to NN 55, the width measurement of holes 44 as documented in the corresponding label 60.

This example of training process is carried out sequentially for each set of training data 62 and corresponding label 60, so that NN 55 is being trained, and thereby, the estimated output from NN 55 is getting closer to the output of the corresponding label 60. In other words, the accuracy of NN 55 is improved along the training process. The stability of the training process is controlled with validation data 62 and labels 60 which are usually related to training data as 10/90.

Note that the number of sets of labels 60 and training data 62 may be between about 30,000 and 70,000 similar to suitable datasets known in the art, such as CIFAR-10 and MNIST. Note that the minimal number of training sets depends on the complexity of the application, the depth of NN 55 structure (as will be described in FIGS. 4 and 5 below), the number of input and/or output parameters, the quality of the training set, and other considerations.

In an example embodiment, the output parameter may comprise angle 47 between axis 37 and axis 7, which is perpendicular to surface 41, and the input parameter may comprise diffraction images. In this example, during the training step, processor 34 is configured to train NN 55 to: (i) estimate the actual value of angle 47 for each input of diffraction image, and (ii) provide a user of system 20 with an output comprising the optimal angle 47 required to obtain the maximal intensity at the respective diffraction image. In other words, NN 55 is configured to recommend the user to adjust the direction of axis 37 of incident beam 31 in order to increase the intensity of the respective diffraction image, and thereby, improve the quality of the X-ray analysis (e.g., measurement of diameter and/or height of the respective holes 44).

In some embodiments, processor 34 is configured to store one or more thresholds indicative of the accuracy level required from NN 55 in order to conclude the training step, e.g., the aforementioned NN training and validation step 2.

At an inference step 3 carried out after concluding NN training and validation step 2, processor 34 is configured to input measurement data 65 received from detector assembly 32 (e.g., one or more diffraction images) to a trained deep learning model 66 obtained after concluding the training and validation of NN 55. Subsequently, in response to receiving measured data 65, trained deep learning model 66 is configured to output one or more inference parameters 67. For example, inference parameters 67 may comprise: (i) measurement of diameter and/or height of the respective holes 44, and/or (ii) optimal angle 47 required to obtain the maximal intensity at the respective diffraction image of the respective holes 44. Note that processor 34 is configured to control stage 40 to rotate wafer in at least one of $\chi$ and $\omega$ directions (i.e., about at least one of the $\chi$ and $\omega$ axes) in order to obtain the optimized angle. These parameters may be used to monitor a process or be used as one or more starting parameter values into a physical modelling software or used to control the SAXS system in FIG. 2 before subsequent measurements, i.e., alignment.

The block diagram illustrating process sequence 54 is provided by way of example and for the sake of conceptual clarity, and may be applied, mutatis mutandis, in other applications. Moreover, process sequence 54 may be adjusted or may include additional and/or alternative steps and operations, in order to implement the process in various environments. Additional details of process sequence 54 are described, for example, in U.S. Provisional Patent Application 63/390,328 to Baranovskiy et. al, (filed Jul. 19, 2022), whose disclosure is incorporated herein by reference.

Figure 4:
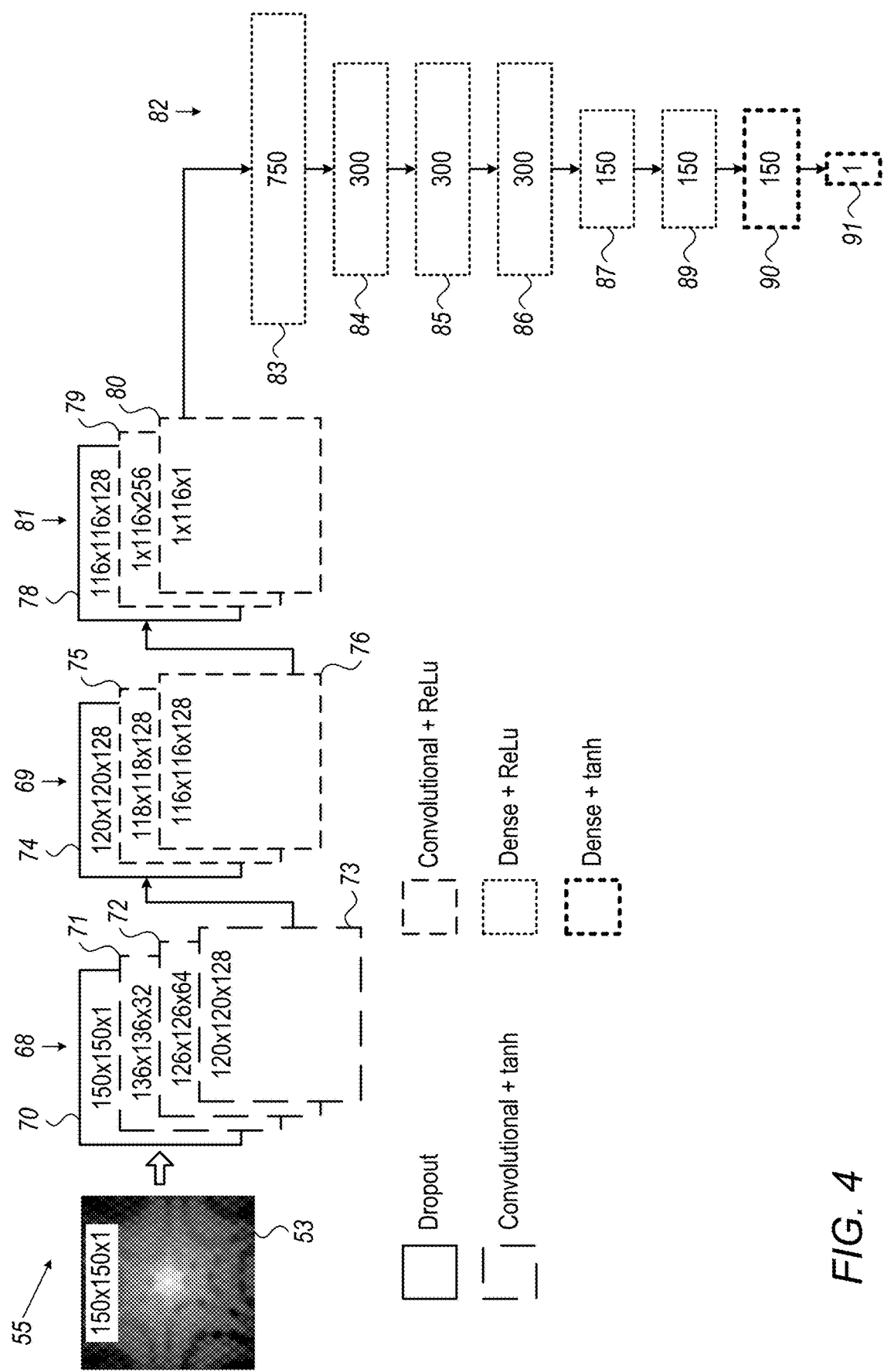
FIG. 4 is a schematic illustration of a structure of the NN of FIG. 3, in accordance with an embodiment of the present invention.

FIG. 4 is a schematic illustration of the structure of NN 55, in accordance with an embodiment of the present invention.

In some embodiments, NN 55 comprises a convolutional neural network (CNN) configured to receive an input diffraction image 53 received from detector assembly 32 and having any suitable size, in the present example, a size of about 150 by 150 pixels.

In some embodiments, NN 55 comprises a block 68 of layers comprising a dropout layer 70, which is configured to switch off some of the neurons of NN 55. For example, dropout layer 70 is configured to set the output of randomly selected approximately 20% of the neurons of NN 55 to zero, and thereby, setting a zero value (e.g., of the gray level) to approximately 20% of the pixels of diffraction image 53. Simultaneously, the dropout level does not change the size of the image and the output is of the same size as an input. In the present example, after applying dropout layer 70 to diffraction image 53, the number of pixels remains 150 pixels by, which is the size of input image. In such embodiments, the dropout layers of the NNs of the present disclosure are applied to compensate for the noisy nature of the input data.

In some embodiments, block 68 comprises a convolution layer 71 having about 32 different sorts of convolution filters (CFs) applied to the 150 pixels by 150 pixels of the image, and therefore, the output of convolution layer 71 has a size of 136×136×32. In the present example, each CF of convolution layer 71 has an array of about 15 pixels by 15 pixels, which is: (i) moved in a step size of one pixel along and across the aforementioned 150 pixels by 150 pixels, and (ii) applied to the 150 pixels by 150 pixels of the image. In other words, the input image (e.g., of 150 by 150 pixels) is divided to patches (e.g., of 15 pixels by 15 pixels, also referred to herein as a first matrix) having the size of the respective CF, which is a predefined convolutional kernel (also referred to herein as a first matrix). Subsequently, an elementwise multiplication and summation the first and second matrices is applied to an output of the respective convolution layer.

In some embodiments, layer 71 comprises a suitable activation function, such as but not limited to a hyperbolic tangent activation function (tanh), which is applied to the output after each CF of layer 71. The tanh is similar to the sigmoid activation function and has the same S-shape, so that the tanh takes any real value as input and outputs values in the range between −1 and 1. Moreover, the hyperbolic tangent sigmoid and positive linear transfer functions are used to represent the hidden layer of sigmoid neurons followed by an output layer of positive linear neurons. Note that the output of the tanh activation function is Zero centered, thus NN 55 is configured to easily map the output values as strongly negative, neutral, or strongly positive in order to identify which of the CFs are more important for identifying the most significant features of the convoluted diffraction image. After the application of all the CFs and tanh functions of layer 71, the size of the image is reduced from about 150 pixels by 150 pixels, to about 136 pixels by 136 pixels.

In some embodiments, block 68 comprises an additional convolution layer 72 having about 64 different sorts of CFs applied to about 136 pixels by 136 pixels of the reduced-size image, and therefore, the output of convolution layer 72 has a size of 126×126×64. In the present example, each CF of convolution layer 72 has an array of about 11 pixels by 11 pixels, which is: (i) moved in a step size of one pixel along and across the aforementioned 136 pixel by 136 pixels, and (ii) applied to the 136 pixels by 136 pixels of the image. Layer 72 also comprises the tanh function described above, so that after applying each CF, the tanh function is applied to the 126 pixels by 126 pixels, using the same techniques described in layer 71 above. After the application of all the CFs and tanh functions of layer 71, the size of the image is reduced from about to about 136 pixels by 136 pixels, to about to about 126 pixels by 126 pixels.

In some embodiments, block 68 comprises an additional convolution layer 73 having about 128 different sorts of CFs applied to the 126 pixels by 126 pixels of the reduced-size image, and therefore the output of convolution layer 72 has a size of 120×120×128. In the present example, each CF of convolution layer 72 has an array of about 7 pixels by 7 pixels, which is: (i) moved in a step size of one pixel along and across the aforementioned 126 pixel by 126 pixels, and (ii) applied to the 120 pixels by 120 pixels of the image. Layer 73 also comprises the tanh function described above, so that after applying each CF, the tanh function is applied to the 120 pixels by 120 pixels, using the same techniques described in layer 71 above.

In some embodiments, NN 55 comprises a block 69 of layers having a dropout layer 74, which is configured to switch off some of the neurons of NN 55, e.g., using the techniques described above in dropout layer 70. Thus, dropout layer 74 is configured to set the output of randomly selected approximately 20% of the neurons of layer 73, so that the output of dropout layer 74 is about 120 pixels by 120 pixels.

In some embodiments, block 69 comprises a convolution layers 75 and 76. Convolution layer 75 comprising about 128 different sorts of CFs applied to the 120 pixels by 120 pixels of the image of dropout layer 74, and therefore, the output of convolution layer 75 has a size of 118×118×128.

In the present example, each CF of convolution layer 75 has an array of about 3 pixels by 3 pixels, which is: (i) moved in a step size of one pixel along and across the aforementioned 120 pixels by 120 pixels, and (ii) applied to the 120 pixels by 120 pixels of the image of dropout layer 74. Using the same technique described in layer 71 above, the input image (e.g., of 120 by 120 pixels) is divided to patches (e.g., of 3 pixels by 3 pixels) having the size of the respective CF, which is a predefined convolutional kernel. Subsequently, an elementwise matrix multiplication and summation of the patch and respective CF is applied to an output of the respective convolution layer.

In some embodiments, instead of the tanh function, each of convolution layers 75 and 76 of NN 55 comprises a Rectified Linear Unit (ReLU), which is applied to the output after each CF of layers 75 and 76. The ReLU is an activation function that returns a zero value if the input is negative, but for any positive value x, the ReLU returns that value back. Therefore, the ReLU can be written as $f(x)=\max(0,x)$.

In some embodiments, after applying convolution layer 75 and ReLU to the 120×120×128 layer, the output number of pixels is reduced to 118 pixels by 118 pixels, and convolution layer 76, which has about 128 CFs, is applied to the 118 pixels by 118 pixels using the technique described in layer 71 above. Moreover, the ReLU is also applied to the output after each CF of layer 76, as described above.

In some embodiments, NN 55 comprises a block 81 of layers that comprises a dropout layer 78, which is configured to switch off some of the neurons of layer 76, e.g., using the techniques described above in dropout layer 70. Thus, dropout layer 78 is configured to set the output of randomly selected approximately 20% of the neurons of layer 76, so that the output of dropout layer 78 is 116×116×128.

In some embodiments, block 81 comprises about 256 convolution layers, referred to herein as a multilayer 79 having about 256 different sorts of CFs with a convolutional kernel size of about 116 pixels by 1 pixel. Therefore, instead of a two-dimensional (2D) layer with 256 channels multilayer 79 comprises a one-dimensional (1D) layer whose output has a size of 1×116×256.

In some embodiments, block 81 comprises a layer 80 that has a convolution size of 1×1 configured to convert data from 256 channels to a single channel. Therefore, layer 80 comprises about 116 neurons along a single line, and having an output size of 1×116×1. The ReLU is also applied to the output after each of 116 neurons of layer 80, as described above.

In some embodiments, layer 79 serves as an integration layer for making NN 55 more focused on evaluating tilting of holes 44. Thus, layer 79 comprises a convolutional layer with kernel size equal to the length in the y-direction for the x-tilt, and the length in the x-direction for the y-tilt. In this way the CNN is forced to focus on features disclosed the changes of the symmetry between diffraction patterns from perfectly aligned 50 and tilted 51 holes in special direction. Moreover, this reduces number of weights per neuron in the first fully connected layer (FC) 83, decreases computational time and provides NN from overfitting.

It is noted that deep learning requires a large number of convolutional layers, so as to identify which type of convolution assists the respective CNN in identifying and learning the most important features of the image (or other objects) in question.

In some embodiments, NN 55 comprises a block 82 that comprises a set of fully connected (FC) layers. Note that in fully connected layers (also referred to herein as dense layers), every neuron gets inputs from a corresponding single neuron in the previous layer. This architecture is different from the aforementioned convolution layers in which each neuron obtains information only from neurons inside the convolutional kernel described above.

In the present example, block 82 that comprises a FC layer 83 having about 750 neurons, FC layers 84, 85 and 86, each of which having about 300 neurons, a FC layer 87 having about 150 neurons, and a FC layer 89 having about 150 neurons. In some embodiments, the ReLU is applied to the output of each FC layers 84-87 and FC layer 89.

In some embodiments, block 82 further comprises a FC layer 90 having about 150 neurons, and a FC layer 91, which is the last layer of block 82 and NN 55, and has a single neuron that provides the output of NN 55. The output of NN 55 comprises one or more inference parameters 67, as described in FIG. 3 above. For example, inference parameters 67 may comprise at least one of the following parameters shown in FIG. 2 above: (i) angle 47 between axis 37 and axis 7, which is perpendicular to surface 41, (ii) measurement of one or more diameters, such as diameters 45b, 45c, 46 and 45d, (iii) measurement of height, such as height 52, and (iv) other parameters related to holes 44 and/or to other structures and layers (not shown) of wafer 22.

In some embodiments, the tanh function is applied to the output of each of FC layers 90 and 91, so as to receive the output of NN 55 having a value between about −1 and 1, as described for the tanh functions above.

It is noted that in the CF layers, a larger number of neurons may improve the learning accuracy of NN 55, however, the learning duration is longer and may result in overfitting of the data (e.g., unstable, or incorrect work of NN on unfamiliar data).

In alternative embodiments, NN 55 may comprise any other suitable type of an activation function, which is implemented in NN 55, mutatis mutandis, instead of or in addition to the tanh.

In the present example, NN 55 has been applied to synthetic diffraction images of a periodic array of HAR holes 44. In other embodiments, NN 55 may be applied, mutatis mutandis, to at least one of: (i) periodic arrays of lines and trenches having a HAR structure, and (ii) periodic arrays comprising a suitable combination of: (a) holes 44, and (b) the HAR lines and trenches that are all arranged in a single layer, as described in detail in the overview and in FIG. 1 above.

In such embodiments, NN 55 is configured to output one or more X-ray analysis indicative of one or more variations in at least one of: (i) between at least two of the HAR lines in the first array, (ii) between at least two of the HAR trenches in the first array, and (iii) between at least two of HAR holes 44 in the second array (shown in the example of FIG. 2).

This particular configuration of NN 55 is shown by way of example, in order to illustrate certain problems that are addressed by embodiments of the present invention and to demonstrate the application of these embodiments in enhancing the performance of such a CNN. Embodiments of the present invention, however, are by no means limited to this specific sort of example NN, and the principles described herein may similarly be applied to other sorts of neural networks.

Figure 5:
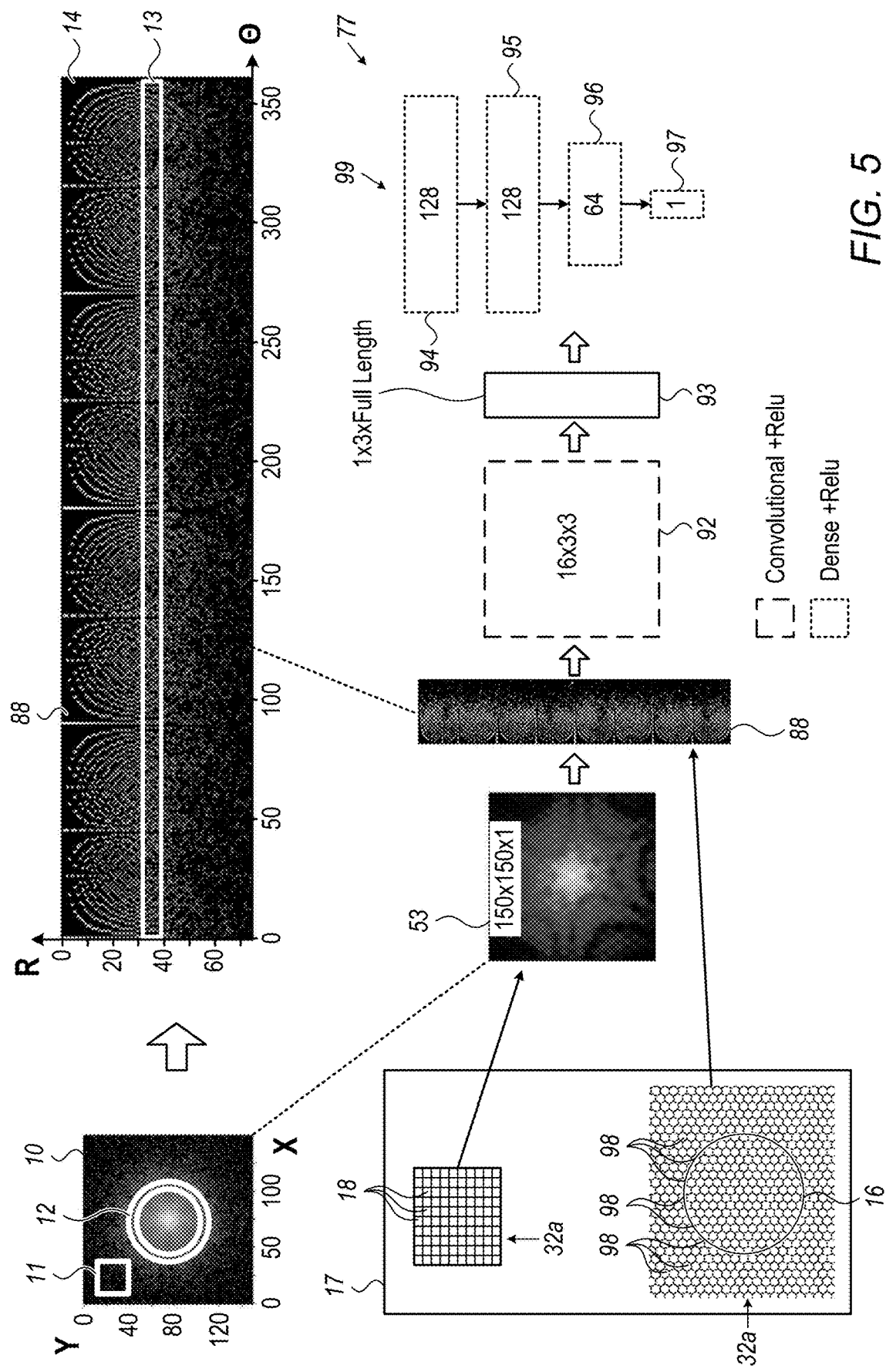
FIG. 5 is a schematic illustration of a structure of an alternative NN used in FIG. 3, in accordance with another embodiment of the present invention.

FIG. 5 is a schematic illustration of a structure of a neural network (NN) 77, in accordance with another embodiment of the present invention. NN 77 may replace, for example, NN 55 of FIG. 3 above.

It is noted that diffraction images from HAR holes of a memory device are arranged in a hexagonal lattice typically have a radial symmetry, but may have some variations. The variations may be caused by several sources, such as structural variations in holes 44 (as shown and described in detail in FIG. 2 above), and Poisson or other noise originated from system 20 (as described in detail in FIG. 3 above).

Reference is now made to an inset 10 showing convolution filters (CFs) 11 and 12 applied to and presented over diffraction image 53. In some embodiments, processor 34 may or may not display CFs 11 and 12 over diffraction image 53, so that the presentation of CFs 11 and 12 is shown for conceptual clarity.

In the present example, CFs 11 and 12 are configured to apply any suitable convolutional kernel (e.g., averaging, or edge filtering) to diffraction image 53 having dimensions of about 150 pixels by 150 pixels. In the example of inset 10, (i) CF 11 comprises a cartesian coordinate-based CF, such as the CFs described in detail in FIG. 4 above, and (ii) CF 12 comprises a circular CF (CCF), and therefore, also referred to herein as a CCF 12. In principle it is possible to apply CCF 12 to diffraction image 53, but such application may be complicated to apply to a cartesian-coordinate image, such as diffraction image 53. In some embodiments, it is possible to apply a suitable cartesian coordinate-based CF, such as CF 11, to a conversion of diffraction image 53 to polar coordinates.

Reference is now made back to the general view of FIG. 5. In some embodiments, processor 34 is configured to convert diffraction image 53 to polar coordinates (PCs), and thereby, produce a PC-based diffraction image (PCDI) 88 that in the present example has about 360 degrees and a radius R between about 0 and 75 detector pixels.

Reference is now made to an inset 14 showing PCDI 88 presented over a graph having an angle θ in the horizontal axis and a radius R in the vertical axis. In some embodiments, a CF 13, which corresponds to CF 12 of inset 10, is applied to PCDI 88, and is optionally presented over PCDI 88. Note that due to the transformation from cartesian to polar coordinates, CFs 12 and 13 appear differently in (i) diffraction image 53 (of inset 10) and (ii) PCDI 88 (of inset 14), respectively.

In some embodiments, NN 77 is configured to apply CF 13 to PCDI 88 by moving CF 13 along the R axis, whereas in diffraction image 53 of inset 10, NN 77 is configured to apply CF 11 along both axes of diffraction image 53 in order to cover the entire area of diffraction image 53.

In such embodiments, CF 13 and the scanning thereof are adapted to polar coordinates in order to apply, to PCDI 88, the same convolutional kernel applied by CF 12 to diffraction image 53 shown in inset 10.

Reference is now made back to the general view of FIG. 5. In some embodiments, NN 77 comprises a multi-layered CF 92 having about 16 convolutional layers, each of which having a convolutional kernel size of about 3 pixels by 3 pixels, and therefore, multi-layered CF 92 has a size of 16×3×3. After applying CF 13 to PCDI 88 (as described above) and receiving a given output (also referred to herein as a radial output), NN 77 is configured to apply Multi-layered CF 92 to that given output. Moreover, after applying each layer of multi-layered CF 92, a ReLu is applied to the respective output (e.g., after applying each of the 16 layers of Multi-layered CF 92.

In some embodiments, NN 77 comprises a multi-layered CF 93, which is configured to apply, to the output of multi-layered CF 92 and ReLU (described above): (i) one (as shown on inset 77) or several CF of 3 pixels width and full length of output from CF 92 convolutions (3×358), and (ii) ReLU after each of the full-length convolutions. Note that such convolution corresponds to applying a circular convolution in Cartesian coordinates as shown and described in inset 14 above.

In some embodiments, NN 77 comprises a block 99 comprising fully connected (FC) layers 94, 95, 96 and 97, having 128, 128, 64 and 1, neurons, respectively.

It is noted that, in order to take advantage of the radial symmetry of the diffraction pattern of image 53 and PCDI 88, multi-layered CF 93 may serve as an integration layer before applying the FC layers of block 99 to the output of multi-layered CFs 92 and 93, and the respective ReLU.

In some embodiments, a ReLU is applied to the output obtained after applying each of FC layers 94, 95, 96 and 97, so that the output of FC layer 97 comprises a positive number. For example, in case the output of NN 77 after FC layer 97 should be indicative of a diameter of hole 44, ReLU must be applied to the output after applying FC layer 97 in order to ensure the output of NN 77 is larger than zero.

Additionally, or alternatively, the output of NN 77 may be indicative of a recommended angle 47 for directing incident X-ray beam 31 to a predefined site of wafer 22 in a subsequent measurement. In such embodiments, tanh or linear unit can be applied to the output after applying FC layer 97 in order to ensure the output of NN 77 covers all possible values of alignment angle between axis 37 and surface 41 shown in FIG. 2 above.

In some embodiments, by converting any suitable image having a radial symmetry, such as diffraction image 53, to polar coordinate, the respective CNN may be simplified. In the present example, both NNs 55 and 77 are configured to be trained, and subsequently, used for analyzing (e.g., measuring the diameter of) holes 44. As such, NN 77 appears to be much simpler than NN 55, and therefore, the training of NN 77 is expected to be shorter. For example, NN 77 requires a substantially smaller number of training sets (compared to NN 55) in order to converge. In the context of the present disclosure, the term converge refers to obtaining the trained model described in FIG. 3 above. For example, when the calculated difference between the output of NN 77 and the output of the corresponding training set is smaller than a given threshold or when this difference reaches saturation i.e., does not change with increased training, as also described in FIG. 3 above.

Additionally, or alternatively, as compared to NN 55 described in FIG. 4 above, when applying NN 77 and the techniques described in FIG. 5, the training time duration for each training set is approximately two orders of magnitude shorter compared to that of FIG. 4. Moreover, in the inference stage of radially symmetric images, when using NN 77, the duration of the inference stage is substantially shorter compared to that when using NN 55 or any other suitable NN configured to be applied to a diffraction image presented in cartesian coordinates.

In some embodiments, by taking advantage of the radial symmetry of the diffraction pattern of image 53 and PCDI 88, NN 77 may not require more than about 50,000 trainable parameters. As a comparison, for the same application selecting a widely used CNN architecture, such as AlexNet (provided by Alex Krizhevsky in collaboration with Ilya Sutskever and Geoffrey Hinton), requires a substantially larger number of trainable parameters. For example, approximately three orders of magnitude more than the aforementioned 50,000 trainable parameters. It is noted that such a smaller amount of required trainable parameters results in a simplified structure of the respective NN (e.g., NN 77), a smaller amount of training data, and thereby, reduces the time of both the training and the inference stages described above.

In other words, the throughput of the training and inference stages can be improved by several orders of magnitude for evaluation of average CD. Note that this architecture and technique also enable preserving accuracy and precision typical for full profiling of X-ray diffraction patterns based on a physical model. Moreover, such analysis can be performed automatically, e.g., without supervision, in contrast to regression based on a physical model, where supervision from a qualified operator is required during model development and utilization. In case of NN based analysis all parameters that require a validation and/or adjusting from the supervisor were validated and adjusted during reference data analysis 56 with X-ray solver 58, generating synthetic data 59 and training NN (inset 54).

In the context of the present disclosure and in the claims, NN 77 is also referred to herein as a radial net, which is intended to be applied to PCDI 88, which is a conversion of diffraction image 53 to polar coordinates.

In some embodiments, the disclosed techniques may be generalized to any image expected to have a radial symmetry. In such embodiments, the disclosed techniques comprise, inter alia, converting the image to polar coordinates, also referred to herein as a radial image, and subsequently, training and applying a radial net to one or more sets of radial images. These techniques may simplify the training process at the training step and/or improve the accuracy in the inference step.

Reference is now made to an inset 17 showing two optional configurations of the outer surface of X-ray detector assembly 32, referred to herein as detector assemblies 32a and 32b.

In some embodiments, in detector assembly 32a, the outer surface that is configured to detect the X-ray photons diffracted from holes 44, comprises an array of rectangular (e.g., square) cells 18. For example, the array of cells 18 may comprise about 150 cells by 150 cells, so that the number of X-ray photons detected by a given cell 18 is indicative of the gray level of a corresponding pixel in diffraction image 53. In this configuration, processor 34 is configured to produce diffraction image 53 based on the X-ray photons detected by cells 18 in response to applying incident X-ray beam 31 to wafer 22.

In other embodiments, in detector assembly 32b, the outer surface that is configured to detect the X-ray photons diffracted from holes 44, comprises hexagonal cells 98 arranged in a radial symmetry and/or a hexagonal arrangement of the resulting pixels. For example, every point of a virtual circle 16 falls on a respective hexagonal cell 98. In this configuration, processor 34 is configured to produce PCDI 88 based on the X-ray photons detected by cells 98 in response to applying incident X-ray beam 31 to wafer 22. In other words, detector assembly 32 may comprise an array of cells (e.g., cells 98), wherein each cell has a suitable shape (e.g., a hexagonal shape). In this configuration, the cells can be arranged along a perimeter of a circle (e.g., virtual circle 16) or any structure having a radial symmetry. Thus, based on the signals received from detector assembly 32, processor 34 is configured to produce the diffraction image (e.g., PCDI 88) directly in polar coordinates. Moreover, a radial NN (e.g., NN 77), which is typically smaller and faster to train, may be used for analyzing images (e.g., PCDI 88) having a radial symmetry.

This particular configuration of NN 77 is shown by way of example, in order to illustrate certain problems that are addressed by embodiments of the present invention and to demonstrate the application of these embodiments in enhancing the performance of such a CNN. Embodiments of the present invention, however, are by no means limited to this specific sort of example NN, and the principles described herein may similarly be applied to other sorts of neural networks.

Moreover, the shape of detector assembly 32a and the shape and arrangement of cells 98 are provided by way of example, in order to accomplish a circular geometry (e.g., of circle 16), and thereby, to obtain a diffraction image having polar coordinates. Embodiments of the present invention, however, are by no means limited to this specific sort of example shape and arrangement of cells, and the principles described herein may similarly be applied to other suitable configurations of detector assemblies.

Figure 6:
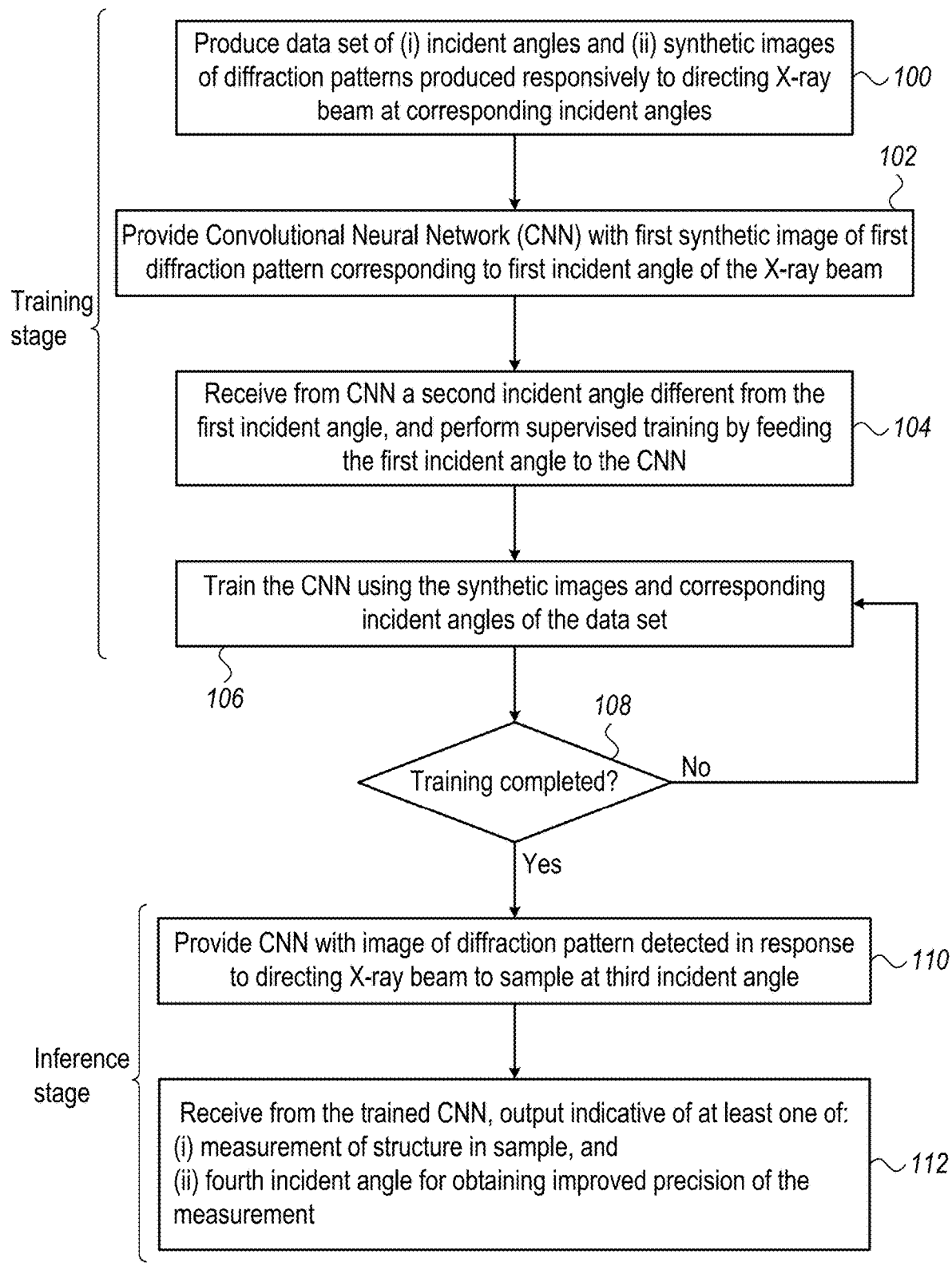
FIG. 6 is a flow chart that schematically illustrates a method for training the NN of FIG. 3, and subsequently, using the NN for improving X-ray analysis of the sample of FIG. 2, in accordance with an embodiment of the present invention.

FIG. 6 is a flow chart that schematically illustrates a method for training NN 55, and subsequently, using NN 55 for improving X-ray analysis of holes 44, in accordance with an embodiment of the present invention.

In some embodiments, the method comprises a training stage, an inference stage, and a decision step carried out between the training and inference stages. In the present example, the computing and data arrangement operations are described as if all of them are carried out using processor 34. In other embodiments, at least one of the operations described in the method may be carried out using any other processing unit, which can be part of or external to system 20.

The following steps are carried out during the training stage that begins the method. At a dataset production step 100 processor 34 is configured to produce a dataset comprising incident angles, such as angle 47. Additionally, or alternatively, the dataset may comprise output of measurement results, such as but not limited to a first set of diameters 45a, 45b and 45c of arrays of holes 44a, 44b and 44d, respectively. As described in detail in FIG. 3, the dataset further comprises synthetic images and optionally real images (e.g., diffraction images 61b and 61a, respectively) of diffraction patterns, which are produced responsively to directing X-ray beam 31 at corresponding incident angles (e.g., angle 47). Additionally, or alternatively, the aforementioned diffraction images may correspond to the arrays of holes 44a, 44b and 44d. Note that the synthetic images are produced based on a simulation of the interaction between beam 31 and holes 44 of wafer 22.

Moreover, processor 34 is configured to perform preprocessing operations on the dataset, so as to reduce the duration of the training stage, and subsequently, the accuracy of NN 55 at the inference stage that will be described in detail below. For example, the preprocessing may comprise transforming the intensity values of the diffraction images using any suitable transformation, such as logarithmic or square root, and/or applying an intensity filter for removing diffraction images whose intensity is smaller than the intensity filter and/or the noise level in the diffraction image is larger than a predefined noise threshold. Additionally, or alternatively, the preprocessing may comprise normalization of the intensity values of the diffraction images relative to the intensity of incident beam 31 or relative to the maximum intensity value. These preprocessing techniques are optional techniques for treating the data prior to feeding the data as input into the neural network. Note that preforming the pre-processing comprises transforming the data so as to improve the sensitivity of some parameter inference. The preprocessing may be required for removing random fluctuations that do not provide useful information about the structure under analysis, the random fluctuations may be caused, for example, by some non-linearity in the intensity and noise of the data.

At a first training step 102, processor 34 is configured to provide NN 55 with a first synthetic image (e.g., diffraction image 61*b*) of a first diffraction pattern of holes 44. As described in FIGS. 2 and 3, and in step 100 above, diffraction image 61*b* corresponds to a simulation of the interaction between (e.g., diffraction of) a first incident angle (e.g., angle 47) of X-ray beam 31 and one or more specific arrays of holes 44 of wafer 22.

At a second training step 104, in response to applying NN 55 to diffraction image 61*b*, processor 34 is configured to receive from NN 55 an output of step 102 comprising a second incident angle different from the first incident angle. It is noted that the difference between the first and second incident angles is due to insufficient accuracy of NN 55 during the training stage. In some embodiments, processor 55 is configured to preform supervised training by feeding the first incident angle to NN 55.

Additionally, or alternatively, in response to applying NN 55 to diffraction image 61*b*, processor 34 is configured to receive from NN 55 an output of step 102 comprising a second set of diameters 45*a*, 45*b* and 45*c*, which is different from the first set of diameters 45*a*, 45*b* and 45*c*. It is noted that the difference between the first and second set of diameters is due to insufficient accuracy of NN 55 during the training stage. In some embodiments, processor 55 is configured to preform supervised training by feeding the first set of diameters 45*a*, 45*b* and 45*c* to NN 55.

At a third training step 106, processor 34 is configured to use: (i) additional synthetic (e.g., diffraction) images, and (ii) corresponding incident angles and/or diameters of the data set, for training NN 55 in an iterative process described in steps 102 and 104 and in FIG. 4 above.

In some embodiments, processor 34 is configured to store one or more thresholds indicative of the required accuracy of NN 55 during the training stage. For example, (i) a first threshold indicative of the difference between (a) the diameter of a given array of holes 44, which is stored in the dataset, and (b) the output diameter of the given array of holes 44 received from NN 55 during the training stage, and (ii) a second threshold indicative of the difference between (a) the angle of incident beam 31 stored in the dataset and (b) the angle received in response to applying NN 55 to the corresponding diffraction image of the dataset during the training stage.

In principle, when producing a real diffraction image, the signal-to-noise ratio (SNR) is improved by increasing the signal acquisition time, e.g., when applying beam 31 to a measurement site for about ten seconds, and detecting the X-ray photons scattered responsively. However, when applying beam 31 at a single incident angle, the sensitivity of the measurement to variations is high, which may result in a reduction in the precision (e.g., repeatability and reproducibility) of the respective measurement.

In some embodiments, the diffraction images (e.g., one or more of diffraction images 61) may be produced using real and/or simulated multiple sub-shots. For example, instead of using a single acquisition time (also referred to herein as a shot) of about ten seconds for producing a single diffraction image, processor 34 is configured to produce about five diffraction images, each of which having an acquisition time (i.e., shot duration) of approximately two seconds. Based on the (real and/or simulated) five 2-second shots, processor 34 is configured to produce five diffraction images 61, respectively. Subsequently, processor 34 is configured to apply NN 55 to the five diffraction images 61, and responsively, receive from NN 55 five recommended angles for directing incident X-ray beam 31 relative to surfaces 39 and 41 of wafer 22. This technique is also referred to herein as a multi-subshot technique.

In some embodiments, based on the five recommended angles, processor 34 is configured to determine the final recommended angle for directing incident X-ray beam 31 relative to surfaces 39 and 41 of wafer 22. For example, based on the five recommended angles, processor 34 is configured to calculate an average incident angle, or to determine the final recommended angle using any other suitable calculation and/or criterion.

In some embodiments, in order to determine the average angle of holes 44 with respect to surfaces 39 and 41 of wafer 22, which is done by determining the angle of holes 44 with respect to X-ray beam 31 and then also knowing the angular relationship between the normal to surfaces 39 and 41 and incident X-ray beam 31.

In some embodiments, by applying the multi-subshot technique, processor 34 is configured to optimize the determination of the recommended incident angle of beam 31, and thereby, to improve the precision of the measurement without compromising on the throughput, because the total acquisition time remains constant (e.g., about ten seconds).

In some embodiments, steps 100-106 above are carried out during the training stage using the iterative process described above. At a decision step 108, processor 34 is configured to check, e.g., after each iteration, whether the training is completed. For example, processor 34 is configured to compare, after each iteration, whether the difference in the diameter and/or incident angle is smaller than the first and/or second threshold, respectively. In case at least one of the differences is larger than the corresponding threshold, the training has not been completed and the method loops back to step 106 to continue the training stage. Alternatively, in case the differences of all output parameters (e.g., both diameter and incident angle) are smaller than the corresponding thresholds, the training has been completed and the method proceeds to the inference stage.

In other words, processor 34 is configured to perform a verification step in order to ensure that NN 55 is sufficiently trained and ready for an inference stage.

The following steps are carried out during the inference stage. At an input step 110, processor 34 is configured to provide NN 55 with a subsequent diffraction image, which is a real diffraction image (of a diffraction pattern), also referred to herein as a new diffraction image that has not been provided to NN 55 during the training stage. The new diffraction pattern is produced by processor 34 in response to directing X-ray beam 31 to an array of holes 44 in wafer 22, and receiving from detector assembly 32 a signal indicative of the X-ray photons diffracted from the respective array of holes 44. In some embodiments, beam 31 is directed at a third incident angle between axis 37 and surface 41 (both shown in FIG. 2 above). Moreover, in the present example beam 31 is directed to the array of holes 44 having a first average diameter.

At an output step 112 that concludes the inference stage and the method, processor 34 receives from the trained model (e.g., deep training model) of NN 55, an output indicative of a measurement of the array of holes 44, the measurement having a second average diameter whose difference from the first average diameter is smaller than the first threshold described in the training stage above. Additionally, or alternatively, processor 34 receives from the trained model of NN 55, an output indicative of fourth incident angle, also referred to herein as a recommended angle which is recommended for obtaining improved precision of the diameter measurement. For example, with reference to FIG. 2 above, when measuring the array of holes 44f, the highest intensity of diffraction image 51 is obtained when axis 37 of beam 31 is approximately parallel with axis 43b of holes 44f. In this example, the measurement quality of holes 44f, e.g., at least one of the: (i) repeatability, (ii) reproducibility, (iii) accuracy, and (iv) sensitivity of the measurement is improved when directing beam 31 to wafer 22 at the incident angle recommended by NN 55.

In the present example, NN 77 has been applied to: (i) synthetic diffraction images of a periodic array of HAR holes 44, during the training stage, and (ii) diffraction images acquired in system 20 from a periodic array of real HAR holes 44, such as at least one of the arrays shown in FIG. 2 above.

It is noted that in case NN 77 may be applied, mutatis mutandis, to other sorts of arrays. But the diffraction images (e.g., PCDI 88) of such arrays must typically have a radial symmetry in order to apply NN 77 successfully and obtain the required quality of the X-ray analysis (e.g., measurements of structural variations). In other words, the training and inference stages of NN 77 may be substantially shorter and more effective compared to that of NN 55 when applied to diffraction images having a radial symmetry, but in case at least one of the diffraction images do not have a radial symmetry, the user may consider applying NN 55 to the diffraction images in order to obtain the required quality of the X-ray analysis (e.g., measurements of structural variations).

This particular method of FIG. 6 is shown by way of example, in order to illustrate certain problems that are addressed by embodiments of the present invention and to demonstrate the application of these embodiments in enhancing the performance of system 20. Embodiments of the present invention, however, are by no means limited to this specific sort of example method and NN, and the principles described herein may similarly be applied to other sorts of systems and neural networks. Moreover, it is noted that the method of FIG. 6 may also be applied, mutatis mutandis, to NN 77 of FIG. 5 above, e.g., after obtaining PCDI 88, as described in detail in FIG. 5 above.

Figure 7:
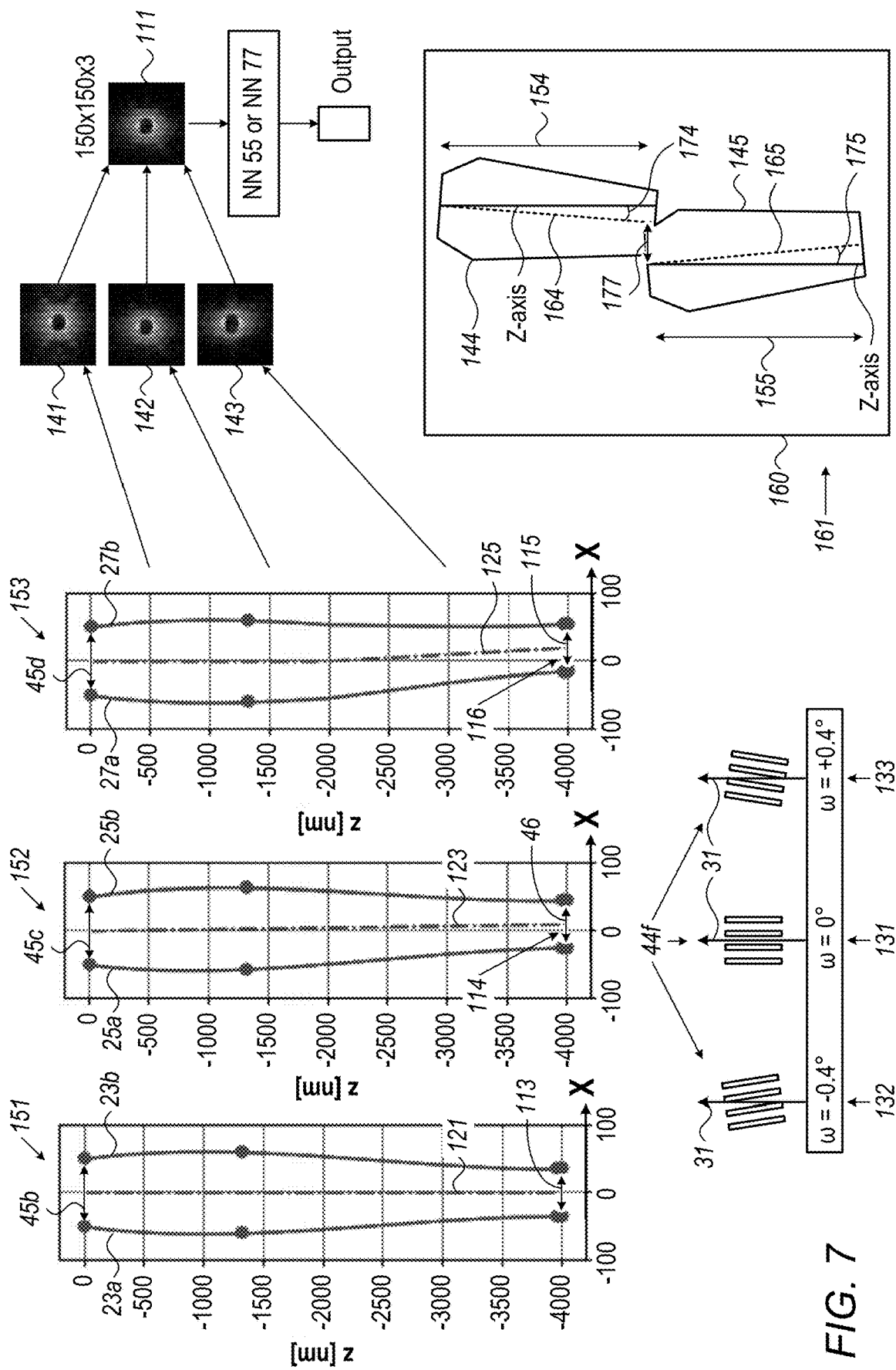
FIG. 7 is a schematic illustration of a method for analyzing variations along the vertical dimension of the holes and other multi-tier structures by applying the NN of FIG. 4 or FIG. 5 to a multi-layered diffraction image of the respective structures, in accordance with an embodiment of the present invention.

Analyzing Variations Along the Vertical Dimension of Holes by Applying Neural Network to Multi-Layered Images FIG. 7 is a schematic illustration of a method for analyzing variations along the vertical dimension of holes 44 and a multi-tier structure by applying NN 55 or NN 77 to a multi-layered diffraction image 111 of holes 44, in accordance with an embodiment of the present invention.

In the context of the present disclosure and in the claims, the term multi-tier structure refers to a structure produced in two or more layers of a stack having a multi-layered structure.

Reference is now made to profiles 151, 152 and 153 of holes 44b, 44d and 44f, respectively, along the vertical axis (e.g., Z-axis) of wafer 22. Profiles 151-153 are displayed on respective graphs having the dimensions (e.g., in nanometers) of holes 44b, 44d and 44f along the X- and Z-axes of wafer 22.

In the present example, profiles 151, 152 and 153 have virtual center lines (CLs) referred to herein as CLs 121, 123 and 125, respectively, whose orientations are determined by the shape of the sidewalls of holes 44b, 44d and 44f, respectively. More specifically, (i) profile 151 has upper diameter 45b and a lower diameter 113 that are defined between sidewalls 23a and 23b, (ii) profile 152 has upper diameter 45c and lower diameter 46 that are defined between sidewalls 25a and 25b, and (iii) profile 153 has upper diameter 45c and a lower diameter 115 that are defined between sidewalls 27a and 27b.

In the example of profile 151, sidewalls 23a and 23b are symmetric relative to the Z-axis, and therefore, diameters 45b and 113 are concentric and CL 121 is parallel to the Z-axis.

In the example of profile 152, sidewalls 25a and 25b are not symmetric relative to the Z-axis, and therefore, diameters 45c and 46 are not concentric and CL 123 is not parallel to the Z-axis. Due to the asymmetry of sidewalls 23a and 23b, CL 123 has a slight linear shift shown at a location 114. This type of vertical variation in hole 44d is also referred to herein as a linear center line shift (CLS).

In the example of profile 153, sidewalls 25a and 25b are also asymmetric relative to the Z-axis, and therefore, diameters 45d and 115 are not concentric and CL 125 has a non-linear CLS along the Z-axis. The non-linear CLS is shown at a location 116.

In some embodiments, processor 34 is configured to control stage 40 to tilt wafer 22 at any suitable direction, such as applying rotation $\varphi$ about an axis normal to the surface of wafer 22 (e.g., the Z-axis of wafer 22), rotation $\chi$ about the Y-axis of the wafer and rotation $\omega$ about the X axis of the wafer. Note that $\chi$ and $\omega$ are both parallel to the surface of wafer 22 but orthogonal to one another, whereas $\varphi$ rotates about the normal to the surface of wafer 22, as described above. In the present example, in positions 131, 132 and 133 wafer 22 is rotated at $\omega$ of about 0°, −0.4° and +0.4° respectively, but in other embodiments, wafer 22 additionally, or alternatively, be rotated at any other suitable angles such as at $\omega$ between about −2.0° and +2.0° (or any other suitable $\omega$ angle and/or any suitable $\chi$ angle) for HAR structures (defined in FIG. 1 above), and between about −20.0° and +20.0° for one or both $\omega$ angle and $\chi$ angle, used in low aspect ratio structures (having an aspect ratio smaller than about 10:1).

In some embodiments, in response to directing beam 31 relative to holes 44f in positions 131, 132 and 133 and receiving corresponding signals received from detector assembly 32, processor 34 is configured to produce diffraction images 141, 142 and 143, respectively. Additionally, or alternatively, processor 34 is configured to produce sets of synthetic diffraction images (e.g., similar to images 141, 142 and 143) and suitable labels corresponding to the synthetic diffraction images, as described in detail, for example, in FIG. 3 above.

In some embodiments, processor 34 is configured to: (i) produce multi-layered diffraction image 111 based on diffraction images 141, 142 and 143, and subsequently, (ii) apply NN 55 or NN 77 to multi-layered diffraction image 111 during at least one of the training inference stages, using the techniques described in detail in FIGS. 4-6.

Note that each of diffraction images 141, 142 and 143 has a size of 150×150×1 (i.e., one image of 150 pixels by 150 pixels), whereas in the present example, the size of multi-layered diffraction image 111 is 150×150×3 (i.e., three image of 150 pixels by 150 pixels each). Moreover, typically processor 34 may apply NN 55 and/or NN 77 to multi-layered diffraction image 111, without changing the structure of NNs 55 and 77, because the size of multi-layered diffraction image 111 in XY directions remains similar to that of diffraction image 53, as described in FIGS. 4 and 5 above.

In other words, one option is to produce an input to the NN that comprises a diffraction image having a larger size than about 150 pixels by 150 pixels. This option, however, requires a new architecture of the NN configured to be applied to a different size of input. Using the disclosed techniques, processor 34 is configured to: (i) produce one multi-layered diffraction image (e.g., multi-layered diffraction image 111) having the same size of each individual layer of diffraction image (e.g., images 141, 142 and 143), and subsequently, apply NNs 55 and/or 77 simultaneously (or using any other suitable sequence) to all the layers (e.g., diffraction images 141, 142 and 143) of the multi-layered diffraction image.

In other embodiments, processor 34 is configured to produce another multi-layered diffraction image based on any suitable number of diffraction images (other than three), which are produced using a corresponding number of tilting positions of wafer 22. Note that the diffraction images may be produced using system 20 (or any other suitable X-ray analysis system) and/or using suitable simulations of the diffraction images.

Reference is now made to an inset 160 showing an overlay error, also referred to herein as a joint shift (JS) between stacked holes 144 and 145 of a device 161, which is produced on wafer 22 or on any other suitable type of wafer.

Note that each of holes 144 and 145 is presented by way of example, and may replace, for example, any of holes 44 of FIG. 2 above, or any other suitable type of HAR structure (e.g., trenches) that may be produced in wafer 22 or in any other wafer intended to be analyzed by system 20. Moreover, in the example of FIG. 2, holes 44 are formed in the same layer, e.g., using photolithography and etching processes known in the art, whereas holes 144 and 145 are formed in two stacked layers of device 161, which are produced in the respective wafer, e.g., using deposition and/or polishing processes know in the art. For example, hole 145 is formed by etching into the substrate of wafer 22, or a layer stack formed over the substrate of wafer 22. Subsequently, hole 145 may be filled with some easily removable material, and subsequently, one or more additional layers are formed over the layer in which hole 145 has been formed. Subsequently, the one or more additional layers are pattered and etched to from hole 144, and the filler material in 145 is removed during the etching process or in a subsequent process. In alternative examples, the structure of device 161 may comprise a line or a pad connecting between holes 144 and 145.

In the present example, a center line 164 of hole 144 is tilted at an angle 174 relative to the Z-axis of the wafer along a depth 154 of hole 144. Moreover, a center line 165 of hole 145 is tilted at an angle 175 relative to the Z-axis of the wafer along a depth 155 of hole 145.

As a result of the tilting, a joint shift (JS) 177 is undesirably formed at an interface area 178 between holes 144 and 145. More specifically, JS 177 is determined by the distance between CLs 164 and 165 at interface area 178. In other words, the size of joint shift 177 is indicative of the level of overlay error caused by the undesired tilting of CLs 164 and 165 (and/or by a relative shifting between positions of holes 144 and 145). A specification of the level of overlay error is determined in the design rules of the respective device, and is applied to process control limits of the fabrication process of the device comprising holes 144 and 145.

Due to the high aspect ratio of holes 144 and 145, measuring the size of JS 177 is typically challenging, regardless the technique applied to conduct the measurement during the fabrication of the respective device.

In principle, it is possible to perform profiling of critical dimensions (also referred to herein as CD profiling or XCD) of the multi-tier structure of inset 160 (or any other suitable type of multi-tier structure), by collecting a number of X-ray diffraction patterns at different rotation angles in X and Y directions for every point on the wafer comprising device 161. These sets are then analyzed by a software utilizing a structural model whose parameters are automatically adjusted using a non-linear regression engine, such as but not limited to NanoDiffract for XCD jointly developed by the applicant of the present disclosure together with Onto Innovation (6. Jonspin Rd, Wilmington, Massachusetts, 01887, United States). Such analysis can be time consuming for both system 20 and the time to carry out the regression. Moreover, the construction of such a structural model requires the supervision of a qualified user of system 20.

In some embodiments, processor 34 is configured to perform measurements of JS 177 by applying to device 161 the techniques used, mutatis mutandis, for analyzing the non-linear CLS of CL 125 of profile 153. More specifically, processor 34 is configured to: (i) produce a set of (e.g., five) diffraction images by tilting the wafer of device 161 at several (e.g., five) rotation angles (e.g., W of about 0°, −0.3°, +0.3°, −0.6° and +0.6° or any other angles in the range of between about −20.0° and +20.0°) relative to incident beam 31, (ii) produce a training dataset using the techniques described above (e.g., in FIGS. 2, 3 and 7), (iii) use the training dataset for training NN 55 and/or NN 77, as described in detail in FIGS. 2-5 above, (iv) produce a multi-layered diffraction image (such as image 111 of FIG. 7) using the five diffraction images of step (i) above, and (v) apply NN 55 and/or NN 77 to the multi-layered diffraction image for performing the average measurement of JS 177 on a plurality of stacked pairs of holes 144 and 145 located within an array of holes of device 161.

In other embodiments, when applying a suitable CNN (e.g., NN 55 and/or NN 77) to a multi-tier structure, such as the structure comprising holes 144 and 145 of device 161, processor 34 may use any suitable number (e.g., between about 2 and 11) of incident angles of beam 31 to obtain additional dependent parameters. For example, nonlinear deviation from average tilt (e.g., CLS) and relative tilt and/or shift between two or more components of a multi-tier structure. Height of the holes, maximum CD (e.g., width), depth of maximum CD (e.g., width), for example, may also require use of several (between about 2 and 11) incident angles even in case of single-tier structure.

The structures and techniques for measuring the (i) non-linear CLS of CL 125 of profile 153, and (ii) JS 177 of device 161, are shown by way of example, in order to illustrate certain problems that are addressed by embodiments of the present invention and to demonstrate the application of these embodiments in enhancing the performance of system 20. Embodiments of the present invention, however, are by no means limited to this specific sort of example multi-tier structures, methods and specific NNs, and the principles described herein may similarly be applied to other sorts of HAR structures using any suitable type of X-ray analysis systems, neural networks, and training and inference techniques.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for training a neural network (NN), the method comprising:
   receiving a training dataset comprising:
   (a) one or more pairs of: (i) a diffraction image indicative of X-ray photons diffracted from one or more structures formed in a sample responsively to directing an incident X-ray beam at an angle relative to the sample, and (ii) a label, comprising a first parameter indicative of at least a first property of the one or more structures, and a second parameter indicative of at least a second property of the incident X-ray beam, and
   (b) one or more predefined outputs for the one or more pairs, respectively; and
   training the NN to obtain the predefined outputs by: (i) applying the NN to at least a given pair of the pairs, and (ii) responsively to receiving from the NN an estimated output of the given pair, providing the NN with a given predefined output of the predefined outputs that corresponds to the given pair.

2. The method according to claim 1, wherein the diffraction image of at least one of the one or more pairs comprises a synthetic diffraction image, which is produced based on the label and empirical data.

3. The method according to claim 1, wherein the one or more structures have a nominal structure, and wherein the first parameter comprises a structural variation from the nominal structure.

4. The method according to claim 3, wherein the one or more structures comprise one or both of: (a) a first array of lines and trenches, and (b) a second array of holes, and wherein the structural variation comprises one or more variations selected from a list of variations consisting of: (i) a width, (ii) a depth, (iii) a tilt, (iv) a roughness, (v) a center line shift (CLS), (vi) a shape of sidewall, and (vii) a joint shift (JS) between at least first and second structured formed over one another in a stack of first and second layers, respectively.

5. The method according to claim 4, wherein the structural variation comprises one or more variations in at least one of: (i) between at least two of the lines in the first array, (ii) between at least two of the trenches in the first array, and (iii) between at least two of the holes in the second array.

6. The method according to claim 1, wherein the predefined outputs comprise one or both of: (i) a size of at least one of the structures in a measurement when directing the incident X-ray beam, and (ii) a recommended angle for directing the incident X-ray beam to the sample in a subsequent measurement.

7. The method according to claim 6, wherein the diffraction image comprises a first diffraction image having a first intensity when directing the incident X-ray beam at the angle, and a second diffraction image having a second intensity, different from the first intensity, when directing the incident X-ray beam at the recommended angle.

8. The method according to claim 7, wherein the first diffraction image has a first symmetry, and the second diffraction image has a second symmetry, different from the first symmetry.

9. The method according to claim 6, and comprising applying a multi-subshot technique for determining the recommended angle for directing the incident X-ray beam to the sample in the subsequent measurement.

10. The method according to claim 1, wherein the diffraction image of at least one of the one or more pairs comprises a synthetic diffraction image, and comprising, producing the synthetic diffraction image based on the label and applying a born approximation of a kinematical scattering theory.

11. A system for training a neural network (NN), the system comprising:
    an interface, which is configured to receive a training dataset comprising:
    (a) one or more pairs of: (i) a diffraction image indicative of X-ray photons diffracted from one or more structures formed in a sample responsively to directing an incident X-ray beam at an angle relative to the sample, and (ii) a label, comprising a first parameter indicative of at least a first property of the one or more structures, and a second parameter indicative of at least a second property of the incident X-ray beam, and
    (b) one or more predefined outputs for the one or more pairs, respectively; and
    a processor, which is configured to train the NN to obtain the predefined outputs by: (i) applying the NN to at least a given pair of the pairs, and (ii) responsively to receiving from the NN an estimated output of the given pair, the processor is configured to provide the NN with a given predefined output of the predefined outputs that corresponds to the given pair.

12. A method for performing X-ray analysis, the method comprising:
    receiving a first diffraction image having a first intensity, the first diffraction image being indicative of first X-ray photons diffracted from one or more structures formed at a site of a sample, responsively to directing an incident X-ray beam at a first angle relative to a surface of the sample;
    applying, to the first diffraction image, a neural network (NN) comprising a trained model, which is pre-trained based on one or more second diffraction images; and
    receiving from the NN one or more inferred parameters, which are based on the first diffraction image and the trained model, and are indicative of at least a recommended angle for directing the incident X-ray beam to the site in a subsequent measurement.

13. The method according to claim 12, wherein receiving the inferred parameters comprises receiving a measured parameter of at least one of the structures based on the first diffraction image.

14. The method according to claim 12, wherein a first measurement quality when directing the incident X-ray beam at the recommended angle is higher than a second measurement quality when directing the incident X-ray beam at the first angle.

15. The method according to claim 14, wherein both the first measurement quality and the second measurement quality comprise at least one of: (i) repeatability, (ii) reproducibility, (iii) accuracy, and (iv) sensitivity.

16. The method according to claim 12, wherein receiving the one or more inferred parameters comprises, in response to applying the NN: (i) receiving, within a first time interval, first inferred parameters when directing the incident X-ray beam at the recommended angle, and (ii) receiving, within a second time interval, second inferred parameters when directing the incident X-ray beam at the first angle, and wherein the first time interval is shorter than the second time interval.

17. The method according to claim 12, wherein the first and second diffraction images have a radial symmetry, wherein a first set of the first and second diffraction images is produced in cartesian coordinates, and a second set of the first and second diffraction images is produced in polar coordinates, and wherein applying the NN comprises: (i) applying to the first set, a first convolutional NN (CNN) having a first number of convolutional layers, and (ii) applying to the second set, a second CNN having a second number of convolutional layers, different from the first number.

18. The method according to claim 12, wherein at least one of the inferred parameters comprises a measured parameter, wherein the sample has first and second surfaces facing one another, wherein at least a given structure of the structures has one or more walls formed between the first and second surfaces and defining a cavity, and wherein a first property of at least one of the measured parameters is indicative of a shape of the one or more walls.

19. The method according to claim 18, wherein the cavity of the given structure is extending between the first and second surfaces, the cavity having a center line (CL) that runs in parallel to the walls and is located at an equidistance from the walls, and wherein the second diffraction images comprise: (i) a first image formed responsively to directing the incident X-ray beam at a first angle and having a predefined size at a given plane, and (ii) a second image formed responsively to directing the incident X-ray beam at a second angle, different from the first angle, the second image also having the predefined size at the given plane, and comprising training the NN by: (i) producing a multi-layered diffraction image comprising the first and second images in first and second layers, respectively, and having the predefined size at the given plane, and (ii) applying the NN to the multi-layered diffraction image.

20. The method according to claim 19, wherein the walls of the given structure are asymmetric along an axis of the sample, and wherein receiving from the NN one or more inferred parameters comprises receiving an indication of a CL shift (CLS).

* * * * *